United States Patent [19]

Smith et al.

[11] Patent Number: 5,566,263

[45] Date of Patent: Oct. 15, 1996

[54] SYSTEM FOR TUNING AN INTEGRATED OPTICAL SWITCH ELEMENT

[75] Inventors: Terry L. Smith, Roseville, Minn.;
Daniel V. Attanasio, Clinton, Conn.;
James E. Watson, Maplewood, Minn.;
George R. Hare, Austin, Tex.

[73] Assignee: Minnesota Mining and Manufacturing Company, St. Paul, Minn.

[21] Appl. No.: 408,214

[22] Filed: Mar. 22, 1995

[51] Int. Cl.$^6$ ..................................................... G02B 6/35

[52] U.S. Cl. .............................. 385/40; 385/16; 385/31; 385/45; 250/227.11

[58] Field of Search ................... 385/40, 16, 17, 385/20, 21, 22, 23, 31, 41, 42, 44, 45; 250/227.11, 227.15, 227.24

[56] References Cited

U.S. PATENT DOCUMENTS

| | | | |
|---|---|---|---|
| 4,769,534 | 9/1988 | Brand | 250/227.15 |
| 4,960,989 | 10/1990 | Liebenrood et al. | 250/227.15 |
| 4,968,880 | 11/1990 | Beller | 250/227.21 |
| 5,013,907 | 5/1991 | Bateman | 250/227.12 |
| 5,020,872 | 6/1991 | DuPuy et al. | 385/4 |
| 5,023,445 | 6/1991 | Goll et al. | 250/227.15 |
| 5,028,775 | 7/1991 | Furukawa et al. | 250/227.15 |
| 5,045,689 | 9/1991 | Froehly et al. | 250/227.15 |
| 5,050,947 | 9/1991 | Kawashima et al. | 385/9 |
| 5,065,201 | 11/1991 | Yamauchi | 357/23.5 |
| 5,072,111 | 12/1991 | Gilino | 250/227.15 |
| 5,093,568 | 3/1992 | Maycock | 250/227.14 |
| 5,144,125 | 9/1992 | Carter et al. | 250/227.11 |
| 5,149,961 | 9/1992 | Arnold et al. | 250/227.11 |
| 5,218,198 | 6/1993 | Bristow et al. | 250/227.24 |
| 5,218,468 | 6/1993 | Shaw | 354/245 |
| 5,255,334 | 10/1993 | Mak et al. | 385/41 |
| 5,259,044 | 11/1993 | Isono et al. | 385/2 |
| 5,261,014 | 11/1993 | Bruno et al. | 385/14 |
| 5,283,842 | 2/1994 | Hakogi et al. | 385/3 |
| 5,388,172 | 2/1995 | Anderson | 385/23 |

FOREIGN PATENT DOCUMENTS

| | | | |
|---|---|---|---|
| 2068248 | 11/1992 | Canada | 385/2 |
| 60-147716 | 8/1985 | Japan . | |
| 2024635 | 1/1990 | Japan . | |
| 2214023 | 8/1989 | United Kingdom . | |
| WO89/11675 | 11/1989 | WIPO . | |

OTHER PUBLICATIONS

"Photonic switches set to prosper," Zucker et al., *Physics World*, Sep. 1991, pp. 57–60.

"Electro-optically switched coupler with stepped $\Delta\beta$ reversal using Ti–diffused $LiNbO_3$ waveguides," Schmidt et al., *Applied Physics Letters*, vol. 28, No. 9, May 1, 1976, pp. 503–506.

"Switch Arrays for Photonic Switching, Status Review and Prospects," Thylen et al., *Globecom '90 IEEE Global Telecommunications Conference & Exhibition*, vol. 2, Dec. 1990, pp. 1296–1300.

Primary Examiner—Rodney B. Bovernick
Assistant Examiner—Phan T. H. Palmer
Attorney, Agent, or Firm—Gary L. Griswold; Walter N. Kirn; H. Sanders Gwin, Jr.

[57] ABSTRACT

A system for tuning an integrated optical switch element utilizes a reflection from a light signal that is propagated into a first input port defined on one side of an interaction region of the optical switch element. The reflection occurs beyond an opposite side of the interaction region from the side on which the light signal is introduced. The reflection is detected at a second input port of the optical switch element on the same side of the interaction region as the side on which the light signals is introduced. The reflection is used to tune the optical switch element to a desired switch state by minimizing the reflection detected at the second input port. By minimizing the reflection detected at the second input port for a desired switch state, the strength of the optical signal through the wave guide channels intended to be used to propagate the light signal in the desired switch state is maximized. As a result, the switching extinction ratio for the optical switch element in the desired switch state is optimized. The system can be used to selectively tune a single optical switch element, or can be used to selectively tune multiple integrated optical switch elements that form anoptical switch matrix on a common substrate, for example.

40 Claims, 14 Drawing Sheets

SYSTEM FOR TUNING AN INTEGRATED OPTICAL SWITCH ELEMENT

RELATED APPLICATION

The present invention is related to a co-pending application filed concurrently in the United States Patent and Trademark Office and entitled "POLARIZATION-INDEPENDENT ELECTRO-OPTICALLY SWITCHED DIRECTIONAL COUPLER" which is assigned to the assignee of the present invention, a copy of which is attached to this application as an appendix and the disclosure of which is hereby incorporated by reference.

BACKGROUND OF THE INVENTION

1. Field of the Invention

The present invention relates generally to integrated optics, and, more particularly, to a system for tuning electrooptically activated integrated optical switch elements so as to optimize the switching performance of the device.

2. Background of the Invention

Optical switch elements, such as directional couplers, X-branch, Y-branch, and balanced bridge optical switches are well known. Typically, an integrated optical switch element is formed of an electro-optic material, such as lithium niobate, which has at least one wave guide channel defined within an interaction region of the electro-optic material for guiding light signals through the interaction region. In order for the wave guide channel(s) to be configured as an optical switch element, there must be at least a first input port into which a light signal is selectively propagated and a second input port. At least a pair of electrodes are used to selectively produce an electric field across the interaction region that electro-optically actuates a desired switch state of the optical switch element.

The most common configurations for optical switch elements are a 2×1 element, e.g., a "Y-branch" switch or a balanced bridge switch element, and a 2×2 element, e.g., a directional coupler or "X-branch" optical switch element. In each case, there are two "input" ports which can receive a light signal and then selectively switch the light signal in the interaction region of the switch element to one of the "output" ports. Because optical switches are generally bi-directional in that light can propagate through the switch in either direction, the determination of whether a port of an optical switch element is an input port or an output port is entirely definitional. A port defined as an input port in one context could be defined as an output port in another context if, for example, the light signal were to enter the switch element on the other side of the interaction region.

The wave guide channels defined in the electro-optic material transmit light signals from the input ports through the interaction region where the light signals may be routed to or away from any of the output ports, depending upon the desired switch state of the optical switch element as determined by the electrical field created by a voltage applied to the electrodes at the interaction region of the device. For example, a light signal entering an input port for a first wave guide channel can be transferred within a 2×2 directional coupler so as to exit at an output port for a second wave guide channel, in which case the switch element is said to be in a "cross state". Alternatively, the light signal entering the input port for the first wave guide channel can be passed through the 2×2 directional coupler so as to remain in the first wave guide channel and exit at an output port for the first wave guide, in which case the switch element is said to be in the "bar" state.

Ideally, an electro-optically activated optical switch element is designed so as to electro-optically switch the light signals between the desired switch states in response to an electric field that is applied across the interaction region where the wave guide channels intersect or are very close to one another. In this region, the wave guide channels are constructed so as not to restrict the light signal to staying within a particular wave guide channel. Consequently, a light signal passing through the interaction region is free to stay within one wave guide channel, cross over to another wave guide channel, or do both, depending upon the optical transmission properties of the wave guide channels within the interaction region. When an electric field is applied across the interaction region of an electro-optic material, the electric field changes the optical transmission properties of the wave guide channels. As a result, the way in which the light signal passes through the interaction region can also be changed. Examples of how existing electrically-activated optical switch elements are configured and operated are shown in U.S. Pat. Nos. 5,050,947 and 5,255,334.

While it would be desirable if optical switch elements operated in a completely digital manner; being either completely on or completely off, the control of the light signal as it passes through the optical switch element is not that simple. In practice, an electro-optically activated optical switch element behaves more like a leaky valve, with most of the light signal being transferred through the desired wave guide channel, but with some of the light signal leaking into the other wave guide channel(s). As long as the relative difference between the optical power propagated to the outputs of each of the wave guide channels is large enough, it is still possible to use the optical switch element in a digital manner. When this relative difference between the optical power of each of the outputs is expressed as a ratio, it is often referred to as the switching extinction ratio of the optical switch element.

Although it would be desirable if only the voltages applied to the electrodes affected the relative difference between the optical outputs, there actually are many factors which can affect the switching extinction ratio of an integrated optical switch element. Some of these factors can be controlled in the design of the optical switch element, such as the physical characteristics of the optical switch element; including wave guide channel length and separations; the properties of the electro-optic material; and the manner in which the wave guide channels are created in the electro-optic material. There are other factors, however, which are not capable of being controlled in the design of the optical switch element, such as the environmental conditions under which the optical switch element is operated.

With this background in mind, some of the various attempts which have been made to control the manner in which electro-optically activated integrated optical switches are used will be summarized.

U.S. Pat. No. 5,283,842 describes a method for physically trimming or altering the wave guide channels in order to affect the operation of the optical switch element. U.S. Pat. Nos. 4,769,534 and 5,023,445 describe methods for providing a feedback signal from a photodetector at an output port of the optical switch element. The feedback signal is used to mask a laser applied to an input port of the optical switch element in situations where the optical switch element is used as part of an optical time domain reflectometer (OTDR). In each of these references, however, no consideration is given to control of the voltages applied to the electrodes used to electro-optically alter the desired switch state of the optical switch element.

Control of the voltages applied to the electrodes of an integrated optical switch has generally been limited to techniques used to control or minimize voltage induced drift, such as described in U.S. Pat. Nos. 5,020,872 and 5,218,468. In each of these patents, the input voltages to a pair of electrodes used in connection with an optical switch element are altered such that there is a zero average of the input voltages over time. By using an average potential difference between the input voltages that is substantially zero, these patents attempt to minimize any drift in the desired operating point voltages of the optical switch element that might be induced by applying a non-zero average voltage to the electrodes over a long period of time. In each of the patents, the zero averaging of the control voltages is accomplished without the use of any type of feedback from the optical switch element.

The use of an input tap off from an optical device as part of a mechanism to control an optical switch element is described in U.S. Pat. No. 5,218,198. In the system described in this patent, there is a tap off of a fraction of an input signal that is sent to an electronic circuit so as to monitor the input signal in order to decide if switching of the optical switch element is necessary. While the tap off signal, and the associated electronic circuitry, are used to control the desired switch state of the optical switch element, the control is accomplished in response to the information contained in the input signal and no attempt is made to control the electrode voltages to compensate for any other factors that might affect the operation of the optical switch element.

In U.S. Pat. No. 5,259,044, the scattering of a light signal is used by an optical device that is not an optical switch element in an attempt to control a DC bias voltage applied to control electrodes on the device. The optical device is a one-input/one-output Mach-Zehnder optical modulator which operates such that a light signal is either allowed to pass from the input port through the modulator to the output port, or is attenuated. In this patent, a photodetector is located on the output side of the interaction region attached to a side face or to an output port of the Mach-Zehnder optical device. The purpose of this photodetector is to detect a scattering of light by the device at the output port. This scattered light is monitored for the purpose of controlling a DC bias voltage applied between a first and second control electrode. Because a Mach-Zehnder optical modulator does not perform any "switching" functions, and because the scattered light signal never passes back through the interaction region of the device, the manner in which the scattered light signal is detected and monitored as taught by this patent is of little use in controlling the operation of an integrated optical switch element.

While there is a growing interest in the use of electro-optically activated integrated optical switch elements for optical devices and systems, there has been little effort directed to the manner in which such optical switch elements can be controlled to optimize their performance. Consequently, there is a need for a system for tuning an integrated optical switch element that can be used to optimize the performance of the integrated optical switch elements.

SUMMARY OF THE INVENTION

The present invention is a system for tuning an integrated optical switch element by utilizing a reflection from a light signal that is propagated into a first input port defined on one side of an interaction region of the optical switch element. The reflection occurs beyond an opposite side of the interaction region from the side on which the light signal is introduced. The reflection is detected at a second input port of the optical switch element on the same side of the interaction region as the side on which the light signals is introduced. The reflection is used to tune the optical switch element to a desired switch state by minimizing the reflection detected at the second input port. By minimizing the reflection detected at the second input port for a desired switch state, the strength of the optical signal through the wave guide channels intended to be used to propagate the light signal in the desired switch state is maximized. As a result, the switching extinction ratio for the optical switch element in the desired switch state is optimized. The system can be used to selectively tune a single optical switch element, or can be used to selectively tune multiple integrated optical switch elements that form an optical switch matrix on a common substrate, for example.

In accordance with a first aspect of the present invention, a system for tuning at least one integrated optical switch element is provided. Each optical switch element is formed of an electro-optic material having an interaction region and at least one wave guide channel extending through the interaction region. At least a first input port and a second input port are defined on a first side of the interaction region into which a light signal enters. At least one output port is defined on a second side of the interaction region out of which the light signal selectively exits. At least a pair of electrodes selectively produce an electric field across the interaction region that electro-optically actuates a desired switch state of the optical switch element. The system comprises an optical light source that introduces a light signal into a first input port of an optical switch element. The light signal is propagated through at least one wave guide channel to an output port in response to an electrical field across an interaction region. The system further includes a means for causing a reflection of at least a portion of the light signal to occur beyond a second side of an interaction region that is propagated back through at least one wave guide channel. A photodetector operably coupled to a second input port of an optical switch element detects a portion of the reflection. A feedback means operably coupled to the photodetector and at least one optical switch element controls at least one voltage applied to at least one pair of electrodes in response to the portion of the reflection detected by the photodetector to minimize the portion of the reflection and thereby selectively tune at least one optical switch element to a desired switch state.

In accordance with a second aspect of the present invention, a method for tuning at least one integrated optical switch element is provided. Each optical switch element is formed of an electro-optic material having an interaction region and at least one wave guide channel extending through the interaction region. At least a first input port and a second input port are defined on a first side of the interaction region into which a light signal enters. At least one output port is defined on a second side of the interaction region out of which the light signal selectively exits. At least a pair of electrodes selectively produce an electric field across the interaction region that electro-optically actuates a desired switch state of the optical switch element. The method comprises the steps of (a) introducing a light signal into a first input port that propagates through at least one wave guide channel to an output port in response to the electrical field across an interaction region. In step (b), a reflection of at least a portion of the light signal is caused to occur beyond a second side of an interaction region that is propagated back through at least one wave guide channel. In step (c), a portion of the reflection from step (b) is detected at a second input port. Finally, in step (d), one or more voltages applied to at least one pair of electrodes are controlled in response to the portion of the reflection detected in step (c) so as to minimize the portion of the reflection detected in step (c) and thereby selectively tune at least one optical switch element to the desired switch state.

In accordance with a third aspect of the present invention, a tunable integrated optical switch element device is comprised of an electro-optic material having an interaction region and at least one wave guide channel extending through the interaction region. At least a first input port and a second input port are defined on a first side of the interaction region into which a light signal enters. At least one output port is defined on a second side of the interaction region out of which the light signal selectively exits. At least a pair of electrodes selectively produces an electric field across the interaction region that electro-optically actuates a desired switch state of the optical switch element device. Within the device, there is a means for causing a reflection of at least a portion of the light signal to occur beyond the second side of the interaction region that is propagated back through at least one wave guide channel. A photodetector is optically coupled to the second input port of the optical switch element to detect a portion of the reflection that is propagated back.

In accordance with a fourth aspect of the present invention, a tunable integrated optical switch matrix apparatus comprises a substrate formed of an electro-optic switch material having a plurality of optical switch elements defined in the substrate, at least some of the optical switch elements being optically coupled to one another. Each optical switch element includes an interaction region and at least one wave guide channel extending through the interaction region. At least a first input port and a second input port are defined on a first side of the interaction region into which a light signal selectively enters for each optical switch element. At least one output port is defined on a second side of the interaction region out of which the light signal selectively exits for each optical switch element. At least a pair of electrodes selectively produce an electric field across the interaction region that electro-optically actuates a desired switch state of each optical switch element. Within the optical switch matrix apparatus, there is means for causing a reflection of at least a portion of a light signal entering a first input port of a first optical switch element to occur beyond a second side of an interaction region of a second optical switch element. A photodetector is optically coupled to a second input port of an optical switch element to detect a portion of the reflection. A feedback arrangement is operably coupled to the photodetector and the plurality of optical switch elements for controlling one or more voltages applied to the at least one pair of electrodes in response to the portion of the reflection detected by the photodetector to minimize the portion of the reflection and thereby selectively tune at least one of the plurality of optical switch elements to a desired switch state.

Alternate embodiments of the present invention are provided in which the optical switch element has only one output port and the light signal is selectively propagated to the one output port by activating the desired switch state, or in which the optical switch element has two wave guide channels, a first output port and a second output port, and the light signal is selectively propagated primarily to the first output port by activating a first desired switch state and selectively propagated primarily to the second output port by activating a second desired switch state. In one embodiment, the optical switch element is a 2×2 directional coupler utilizing reverse differential propagation constant ($\Delta$, $\beta$) control and the desired switch states to which the directional coupler is tuned are a bar state and a cross state.

Alternate embodiments of the present invention are also provided in which the reflection utilized by the present invention to tune the optical switch element to the desired switch state is a partial reflection that occurs within the optical switch element or at a boundary of the optical switch element, or is a partial reflection or a complete reflection that occurs external to the optical switch element. In another set of alternate embodiments, the photodetector is located on a common substrate with the optical switch element and optically coupled to the second input port, or the photodetector is located on a substrate separate from a substrate on which the optical switch element is located, and the substrate of both the photodetector and the optical switch element are part of a multichip module with the photodetector optically coupled to the second output port of the optical switch element, or the photodetector is located physically separate from the optical switch element and optically coupled to the second input port via an optical fiber.

Preferably, the voltages are controlled by the tuning system of the present invention so as to decrease the reflection detected at the second input port to less than a minimum percentage of light signal introduced into the first input port, where the maximum percentage is determined by a desired extinction ratio for the optical switch element. The present invention is particularly suited to applications of integrated optical switches in optical time domain reflectometers (OTDRs) where the OTDR optical detection system and software can be used as the photodetector and feedback control by which the operating voltages of the optical switch element are tuned. The tuning system of the present invention may be utilized only once for a particular optical switch element, such as in a factory situation to initially calibrate a desired set of operating voltages for the particular optical switch element, or the present invention may be incorporated as part of the optical switch element so as to dynamically tune the optical switch element while the optical switch element is in operation in the field.

DESCRIPTION OF THE PREFERRED EMBODIMENTS

In describing the preferred embodiments of the present invention, a description of the various types of optical switch elements which can be tuned using the present invention will first be presented. Next, the techniques for tuning a 2×1 and a 2×2 optical switch element will be described, including variations on the manner in which the tuning reflection is generated and detected in various alternate embodiments. Finally, the tuning techniques of the present invention will be described in application to an optical switch matrix comprised of multiple optical switch elements.

There are two basic kinds of optical switch elements to which the present invention is primarily directed. A 2×1 optical switch element has two input ports, but only one output port, and the light signal is selectively propagated either to or away from the one output port by activating the desired switch state. In a 2×2 optical switch element there are two input ports, two wave guide channels, and a first output port and a second output port. The light signal in a 2×2 optical switch is selectively propagated primarily to the first output port by activating a first desired switch state and selectively propagated primarily to the second output port by activating a second desired switch state.

Figure 1:
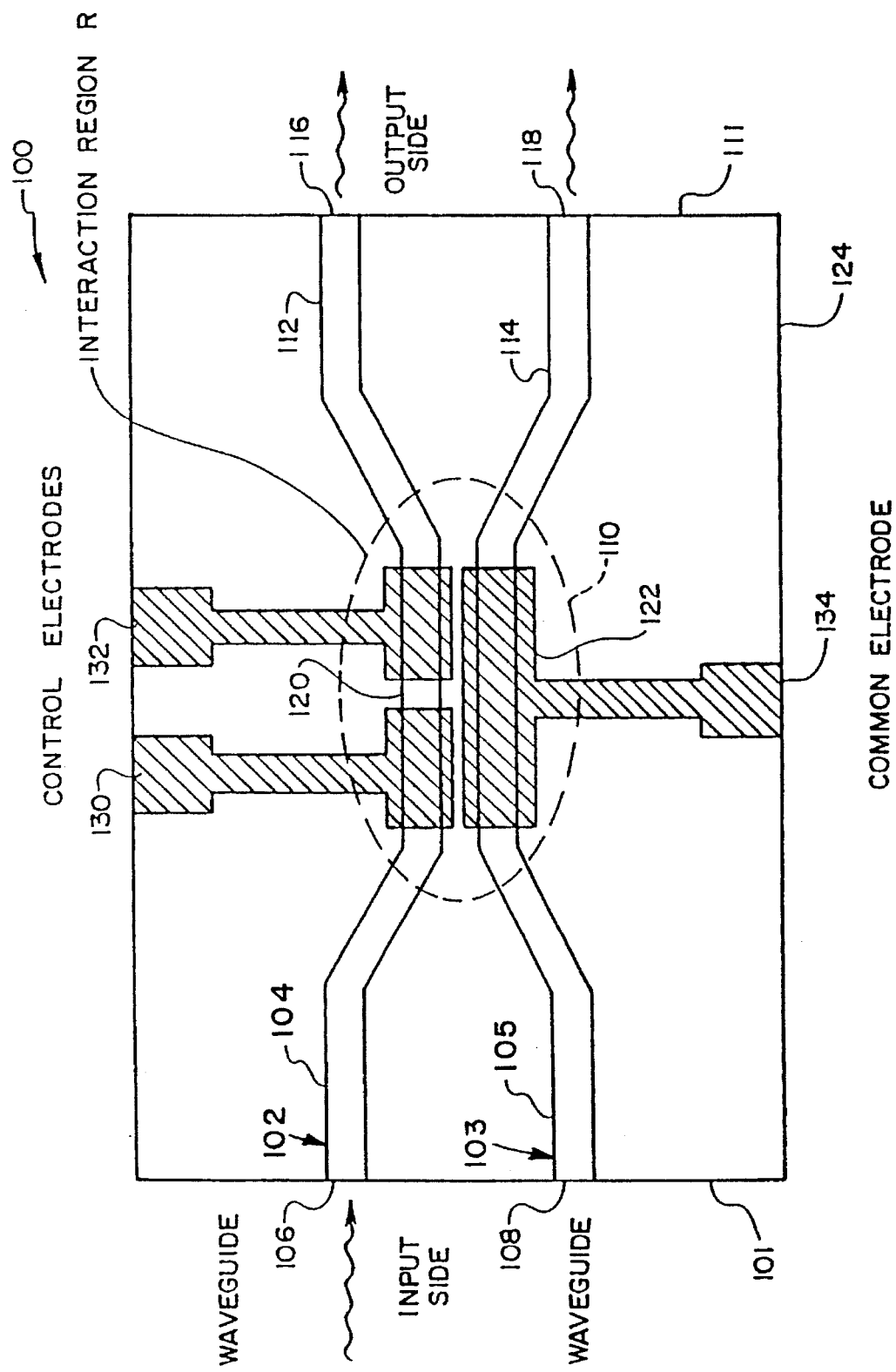
FIG. 1 is a plan view of a reverse-delta-beta directional coupler integrated optical switch element, with electrodes configured as appropriate for z-cut LiNbO$_3$.

One example of a 2×2 optical switch element is a conventional 2×2 directional coupler 100, as shown for example in FIG. 1. In directional coupler 100, an input side 101 has a pair of single mode wave guides 102 and 103, including wave guide sections 104 and 105 that carry light signals from input ports 106 and 108, respectively to an interaction region 110. Similarly, an output side 111 has wave guide sections 112 and 114 that carry light signals to output ports 116 and 118, respectively from interaction region 110. A light signal entering coupler 100 at port 106 can be transferred within coupler 100 so as to exit from second wave guide 103 through wave guide section 114 at port 118 (in which case coupler 100 is in a "cross state"), or the light signal can be passed through coupler 100 so as to remain in first wave guide 102 through wave guide section 112 and exit at port 116 (in which case coupler 100 is in the "bar" state). Because light signals can be passed both ways through coupler 100, a light signal might also enter wave guide at port 116 and be transferred so as to exit second wave guide 103 at port 108 (the "cross" port), or be passed through so as to remain in first wave guide 102 and exit at port 106 (the "bar" port).

For ease of explanation, the basic operational principals of electrooptically controlled optical switch elements will be described with reference to directional coupler 100, although it is understood that these same operational principals are used for all of the other optical switch elements to which the present invention is directed. In the embodiment as described, each wave guide 102, 103 is arbitrarily divided into a number of sections for ease of explanation, although is will be understood that these sections are integrated together to operate as the light conduits of an optical switch element.

Located within interaction region 110 of coupler 100 are wave guide channel sections 120 and 122 which are coupled together by positioning at least a length (L) of channel sections 120 and 122 very close to one another with an effective separation (G). In interaction region 110, wave guide channel sections 120 and 122 are constructed so as not to restrict the light signal to staying within a particular wave guide channel. Consequently, a light signal passing through interaction region 110 will either stay within one wave guide channel, cross over to the other wave guide channel, or do both, depending upon the optical transmission properties of wave guide channel sections 120 and 122 within interaction region 110. In the absence of an applied electric field, the characteristic length required for a light signal to cross from one wave guide channel to the other is referred to as the effective coupling length (1). When an electric field is applied across interaction region 110, the electric field changes the optical transmission properties of wave guide channel sections 120 and 122. As a result, the way in which the light signal passes through interaction region 110 can also be changed.

In a conventional electro-optically switched directional coupler 100, wave guide channel sections 120 and 122 are fabricated in an electro-optically active substrate 124 by increasing the refractive index of substrate 124 in the wave guides. Because wave guide channel sections 120 and 122 are physically close together in interaction region 110, the evanescent optical fields of the two channel sections 120 and 122 overlap, resulting in an optical coupling between wave guide channel sections 120 and 122. The effect of coupling between wave guide channel sections 120 and 122 can be selectively controlled by electro-optically modifying the refractive index in interaction region 110 via an electric field produced by control electrodes 130, 132 and 134 situated in interaction region 110 near wave guide channel sections 120 and 22.

Two independent control electrodes (130 and 132) and a single common electrode (134) effectively create two electrode pairs that can electrooptically control the refractive index of interaction region 110. Alternatively, common electrode 134 can be implemented as two separate common electrodes. The use of two independent control electrodes in this manner is referred to as a directional coupler utilizing reverse differential propagation constant ($\Delta\beta$) control. Two control electrode pairs are used rather than a single electrode pair in order to obtain better control of the switch state of directional coupler 100. For a more detailed explanation of reverse differential propagation constant ($\Delta\beta$) control using two control electrodes, reference is made to R. V. Schmidt and H. Kogelnik, "Electro-optically switched coupler with stepped ($\Delta\beta$) reversal using Ti-diffused LiNbO$_3$ wave guides", *Applied Physics Letters*, Vol. 28, No. 9, 1 May 1976, pp. 503–506.

While it would be desirable if coupler 100 behaved exactly like a digital switch that was either always on (bar state) or always off (cross state), the control of the light signal as it passes through coupler 100 is not that simple. In practice, coupler 100 behaves more like a leaky two-way valve, with most of the light signal being transferred through the desired wave guide channel, but with some of the light signal leaking out the other wave guide channel. As long as the relative difference between the optical outputs of each wave guide channel is large enough, however, it is still possible to use coupler 100 as an effective optical switch having two operational states, the bar state and the cross state.

It is typical to define the operational state of a directional coupler 100 by the ratio of optical power exiting from the two optical ports 116 and 118 in response to a light signal incident upon optical port 106. When the relative difference between the optical output power of each wave guide channel is expressed as a ratio, it is referred to as the switching extinction ratio of directional coupler 100. By convention, the extinction ratio of a reverse $\Delta\beta$ directional coupler is normally defined to be equal to 10 $\log_{10}(c/b)$, where b is the output power of the bar port and c is the output power of the cross port. When directional coupler 100 is behaving in the desired manner of a digital switch, the extinction ratio will be greater than some value dictated by the requirements of the system into which the optical switch element is incorporated. For example, in a typical application, the value of the required extinction ratio might be 15 dB, meaning that less than about 1/30th of the light signal will be emerging from the non-intended port of directional coupler 100. To operate a directional coupler 100 in the desired manner of a digital switch, there will be a cross state set of voltages $V_{1c}$ and $V_{2c}$ which represents the operating voltages which should be applied to electrodes 130 and 132 in order to induce a particular directional coupler 100 to operate in the cross state. In addition, there will be a bar state set of voltages $V_{1b}$ and $V_{2b}$ which correspond to the operating voltages which should be applied to electrodes 130 and 132 in order to induce the same directional coupler 100 to operate in the bar state.

Figure 2:
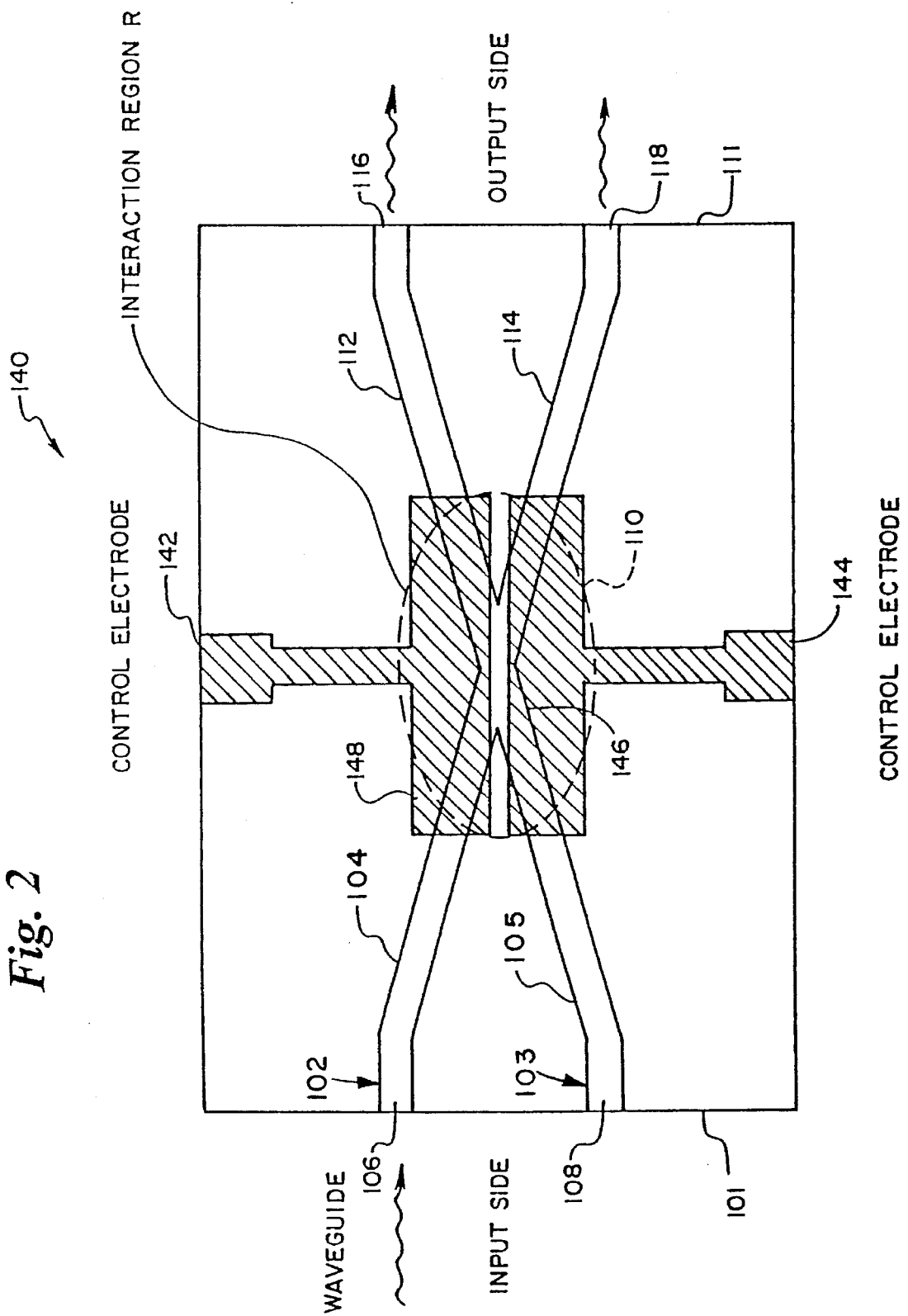
FIG. 2 is a plan view of an X-branch integrated optical switch element.

Referring now to FIG. 2, an X-branch optical switch element 140 will be described. X-branch optical switch element 140 is similar to directional coupler 100, except that a single control electrode pair 142 and 144 are used for electro-optical control, rather than two control electrode pairs 130, 132 and 134 in directional coupler 100. All of the remaining features of X-branch optical switch element 140 are similar to like-referenced elements of directional coupler 100. It will be seen, however, that the topology of wave guide channel sections 105, 104, 112 and 114 is somewhat simpler than in directional coupler 140. Within interaction region 110, wave guide channel sections 146 and 148 intersect one another, rather than the generally parallel configuration which is found for wave guide channel sections 122 and 124 of directional coupler 100.

Figure 3:
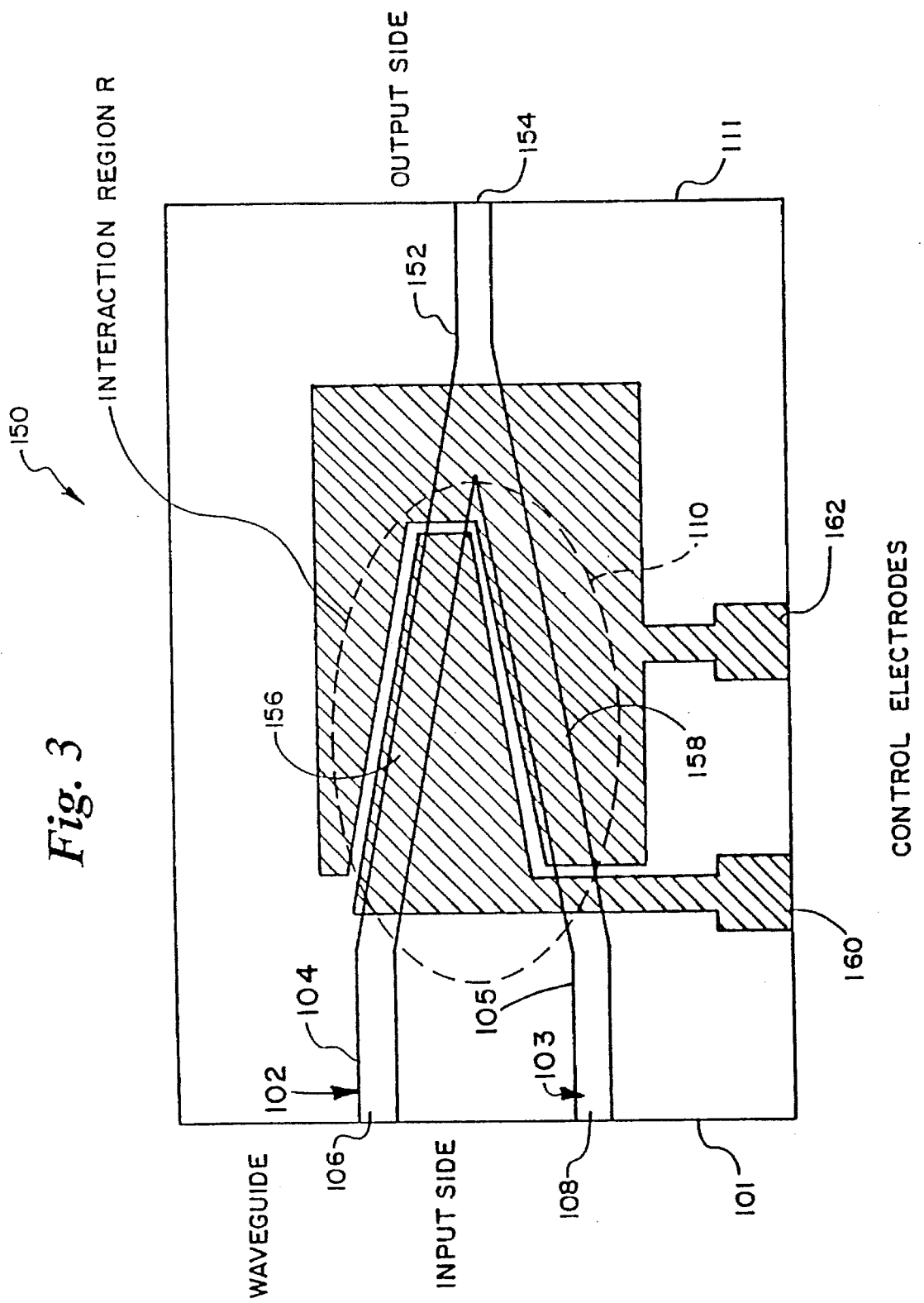
FIG. 3 is a plan view of a Y-branch integrated optical switch element.

Referring now to FIG. 3, a Y-branch optical switch element 150 will be described. In Y-branch optical switch element 150, there are two wave guide channel sections 104 and 105 on input side 101; however, only a single wave guide channel section 152 and output port 154 on output side 111 are provided. Thus, unlike directional coupler 100 and X-branch optical switch element 140 which are 2×2 switch elements, Y-branch optical switch element is a 2×1 switch element. In a typical Y-branch optical switch element 150, interaction region 110 is primarily defined along the points where wave guide channel sections 156 and 158 converge together. Other elements of Y-branch optical switch element 150 are similar to similarly referenced elements in directional coupler 100.

Figure 4:
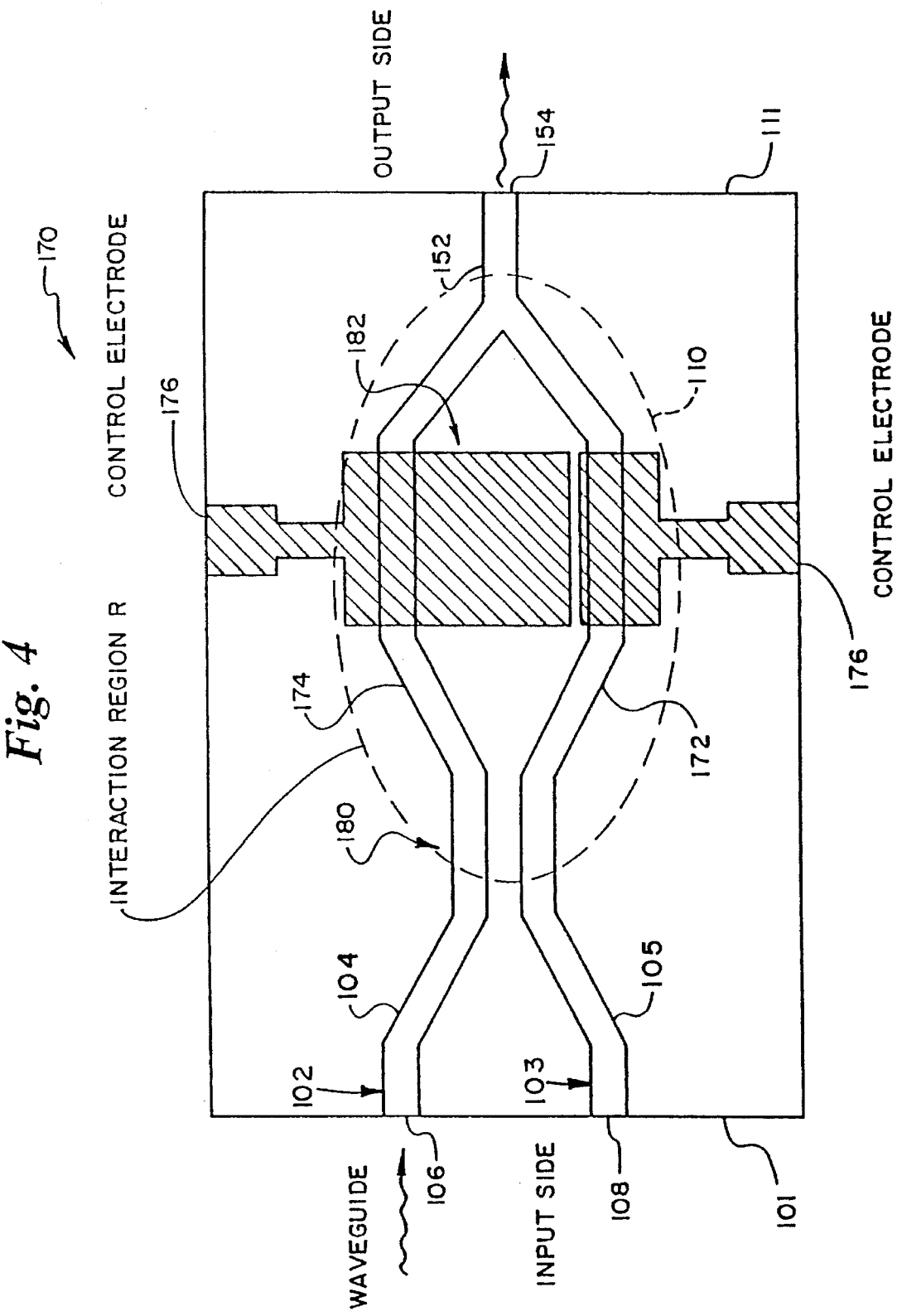
FIG. 4 is a plan view of a balanced bridge integrated optical switch element.

Referring now to FIG. 4, a balanced bridge optical switch element 170 will be described. As in Y-branch optical switch element 150, balanced bridge optical switch element 170 is a 2×1 optical switch element having only a single output wave guide channel section 152 and output port 154. In a typical balanced bridge optical switch element 170, as shown in FIG. 4, wave guide channel sections 172 and 174 have a topology which provides for a first interaction area 180 where wave guide channel sections 172 and 174 are positioned close to one another, but not within the influence of control electrodes 176 and 178, and a second interaction area 182 where wave guide channel sections 172 and 174 are positioned not as close to one another, but within the influence of control electrodes 176 and 178. In this way, the electrical field applied by control electrodes 176 and 178 electro-optically alters the propagation characteristics within second area 182 to control the relative optical phase of the optical signals which are split or combined.

Figure 5:
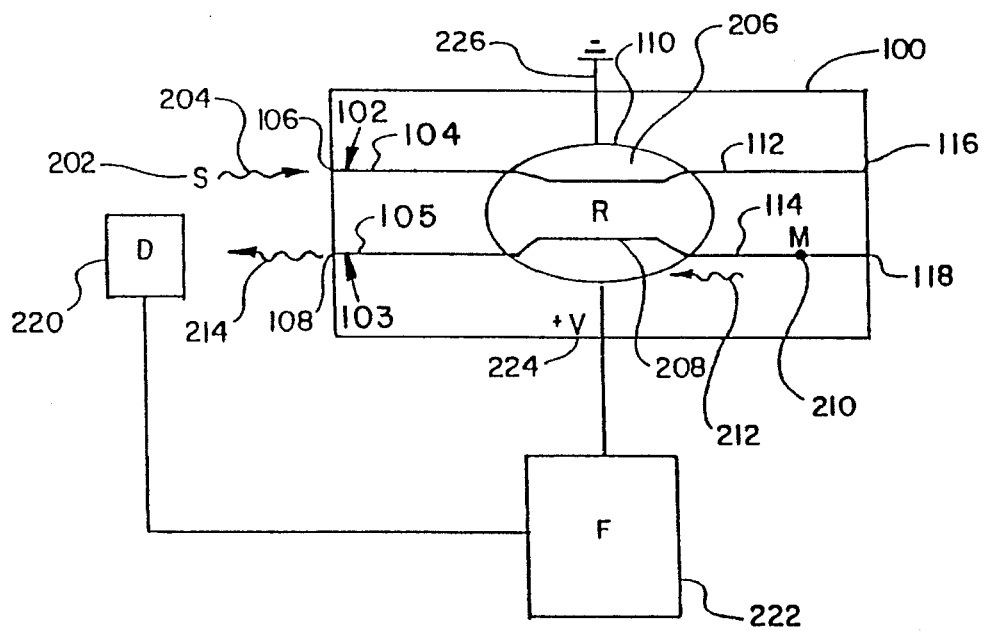
FIG. 5 is a schematic diagram of a system for tuning an integrated optical switch element in accordance with the present invention, the optical switch element having two input and two output wave guides.

With this background of the operation of optical switch elements, it is now possible to describe in general the present invention for tuning optical switch elements. Referring to FIG. 5, a schematic diagram of a system 200 for tuning an integrated optical switch element 100 in accordance with the present invention is shown. In FIG. 5, optical switch element 100 is a 2×2 optical switch element having two wave guide channels 102 and 103, with two wave guide channel sections 104, 105 and two ports 106, 108 on an input side 101 and two wave guide channel sections 112, 114 and two ports 116, 118 on an output side 111. Examples of such a 2×2 optical switch element are optical switch element 100 as shown in FIG. 1, optical switch element 140 as shown in FIG. 2, or any equivalent thereof.

An optical light source 202 introduces a light signal 204 into first input port 106 of optical switch element 100. Light signal 204 propagates through at least one wave guide channel section 206, 208 within interaction region 110 to either of output port 116 or 118 in response to an electrical field across interaction region 110. An optical reflector 210 causes a reflection 212 of at least a portion of light signal 204 to occur on output side 111 of optical switch element 100 that is propagated back through interaction region 110 to at least one wave guide channel section 104, 105, 206, 208. As will be discussed, optical reflector 210 may be located in a variety of positions, so long as optical reflector 210 is at least beyond the side of interaction region 110 out of which light signal 204 passes. A photodetector 220 is operably coupled to a second input port 108 of optical switch element 100 to detect a portion 214 of reflection 212. Feedback control circuit 222 is operably coupled to photodetector 220 and optical switch element 100 for controlling at least one voltage applied to at least one pair of electrodes 224, 226 in response to portion 214 of reflection 212. Feedback control circuit 222 is arranged and operated so as to minimize portion 214 of reflection 212, thereby effectively tuning optical switch element 100 to a desired switch state. Where there is more than one desired switch state, feedback control circuit 222 has the ability to select among desired switch states.

To understand how feedback control circuit 222 can tune optical switch element 100, it is necessary to understand how light passes through optical switch element 100 when optical switch element 100 is in different switch states. In a first switch state for a 2×2 switch element, in this example the "cross" or "normal" state, no voltage or a relatively small voltage is typically applied across electrodes 224 and 226. In this example, the propagation characteristics of wave guide channel sections 206, 208 would be designed such that light signal 204 would tend to cross from wave guide channel section 206 to wave guide channel section 208 while traversing through interaction region 110. In this first state it is intended that light signal 204 enters port 106, travels through channel sections 104, 206, 208 and 114 and exits port 118, effectively taking a "crossed" line through optical switch element 100. As previously described, however, even in the best of circumstances for this first switch state, some portion of light signal 204 will stay within wave guide channel section 206 in interaction region 110, not crossing to wave guide channel 208 as intended, and travel through wave guide section 112 to exit through port 116. Ideally, the portion exiting from the non-intended output port, in this case port 116, should be as small as possible in order for switch element 100 to have as large an extinction ratio as possible.

Conversely, in a second switch state for a 2×2 switch element, the "bar" or "modified" state in this example, a voltage is applied to electrodes 224 and 226 that electro-optically controls the propagation characteristics of properly designed wave guide channel sections 206 and 208 so that when light signal 204 propagates through interaction region 110 it travels straight through and light signal 204 tends to stay within wave guide channel section 206 and travel into wave guide channel 112. In this second state, it is intended that light signal 204 enters port 106, travels through channel sections 104, 206 and 112 and exits port 116, effectively taking a "straight" line through optical switch element 100. Again, not all of light signal 204 will behave in the manner intended and the ideal is that the portion of light signal 204 exiting the output port, in this case port 116, should be as large as possible for this second switch state.

The choice of electrode voltages and design parameters for the example described are only examplary. It should be understood that the nature of which operating point or switch state is at the zero voltage and which is at the applied voltage is a matter of design choice, and that it is equally possible to operate both switch states at some positive or negative applied voltage.

Normally, if switch element 100 is to be tuned, for example, at a factory, to have an optimized extinction ratio for the first switch state, photodetectors would be connected to output ports 116 and 118 and the voltages applied to control electrodes 224 and 226 would be manually adjusted until the extinction ratio as measured between output ports 116 and 118 is maximized. As discussed in the background section of the application, this procedure can be accomplished only when switch element 100 is not being used as a switch and has, instead, been connected to measurement photodetectors to determine the switching extinction ratio of the device. Measuring the optical output strength of light signal 204 that exits output port 118 while switch element 100 is being used as an active switch would require an additional optical splitter coupled to output port 118 which would then have a photodetector connected to one output in order to measure the strength of light signal 204 received through output port 118.

In the present invention, optical reflector 210 is used to reflect a portion 212 of light signal 204 in wave guide channel section 114 back through interaction region 110. In the second switch state, the majority of reflected portion 212 will remain in wave guide channel section 208 and a minor portion 214 of reflected portion 212 can then be detected by photodetector 220. The smaller the amount of light detected as portion 214 by photodetector 220, the smaller the amount of light that was reflected as reflected portion 212 by optical reflector 210; and, the smaller the amount of reflected portion 212 the smaller the amount of light signal 204 that is coming out of the non-intended output port 118 for this second switch state. Consequently, minimizing the reflected portion 214 by altering the voltages applied to control electrodes 224 and 226 under control of feedback control 220 optimizes the operational transfer characteristics of switch element 100 in the second switch state.

In the case of the first switch state, it is not necessary to change the location of optical reflector 210 so that optical reflector 210 is located within the non-intended wave guide channel. Instead, in the first switch state, the majority of light signal 204 now crosses over to wave guide channel sections 208 and 114. Again, a portion 212 is reflected and returns back through interaction region 110 which, because of the first switch state, will generally cross back over into wave guide channel sections 206 and 104, with only a small portion continuing on into wave guide channel section 105. In the present invention, instead of measuring how small the output light signal is at output port 116 as a test of the forward transfer characteristics of switch element 100, a determination is made of how small the non-crossed portion 214 of reflected portion 212 of light signal 204 is as a function of the reverse transfer characteristics of switch element 100. Because the forward and reverse transfer characteristics of optical switch elements are generally identical, optimizing the performance of optical switch element 100 for the reverse transfer characteristics by adjusting the voltages applied to control electrodes 224 and 226 to minimize detected portion 214 also optimizes the performance of optical switch element 100 for the forward transfer characteristics.

An analysis of the extinction ratios developed by system 200 for switch element 100 is also helpful in understanding the desired operation of the present invention. As previously discussed, the extinction ratio x for switch element 100 is defined as:

$$x = 10 \log (P_c/P_b) \quad \text{Eq. (1)}$$

when a light signal 204 of optical power $P_o$ is launched into input port 106 and optical powers $P_b$ and $P_c$ are measured at output ports 116 and 118 (the "bar" and "cross" paths, respectively). If a reflected signal 212 of strength "r" is generated either for the bar path (i.e., wave guide channel section 112, output port 116 or optical fibers or channels coupled to output port 116) or the cross path (i.e., wave guide channel section 114, output port 118 or optical fibers or channels coupled to output port 118), and all other reflections and coupling losses are neglected, it follows that the optical power incident on photodetector 220 at input port 108 is given by:

$$P_{det} = (r\, P_o) / (2 + 10^{x/10} + 10^{-x/10}) \qquad \text{Eq. (2)}$$

Analyzing Eq. (2), it is apparent that both conditions of high cross-state extinction (large positive x values) and states of high bar-state extinction (large negative x values) will correspond to local minima in $P_{det}$. Therefore, when light source 202 is energized, the voltages applied to control electrodes 224 and 226 may be tuned by having feedback control circuit 222 search for voltage values which minimize $P_{det}$. It will be appreciated that Eq. (2) applies equally as well whether optical reflector 210 is located in the bar or cross path. It can also be shown that Eq. (2) applies to 2×1 optical switch elements as will be described hereinafter.

One of the advantages of the present invention is that system 200 for tuning of optical switch element 100 can be operated continually and is not confined to an "initial factory setting", for example. By selecting optical reflector 210 in an appropriate manner (e.g., a reflection of less than a few percent of the light signal), the transfer characteristic performance of optical switch element 200 is not significantly affected and is easily compensated for by the ability to of system 200 to continually operate switch element 100 at an optimum extinction ratio. Thus, it is relatively straightforward for system 200 to perform continuous feedback control over the performance characteristics of optical switch element 100 so as to compensate for changes in operating conditions, input light signal conditions, voltage drift and the like.

Another advantage of the present invention is that it allows for tuning of an optical switch element without the need for or additional cost and complexity associated with adding optical splitters or detectors to monitor the transfer characteristics of the switch 100 from output side 111. In situations, such as the optical-time-domain-reflectometer (OTDR) described hereinafter, the present invention can also make use of existing detectors and detection circuitry to accomplish the functions of detector 220 of the present invention.

Figure 6:
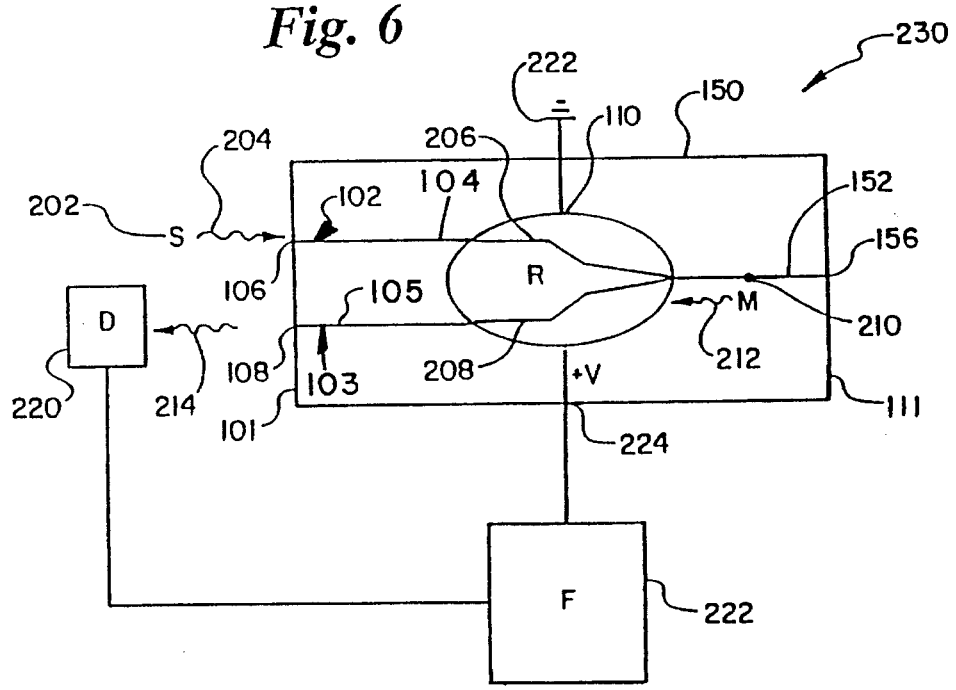
FIG. 6 is a schematic diagram of a system for tuning an integrated optical switch element in accordance with the present invention, the optical switch element having two input and one output wave guides.

Referring now to FIG. 6, a system 230 in accordance with the present invention for tuning a 2×1 optical switch element 150 will now be described. For the most part, the operation of system 230 is identical to that for system 200 and like reference numerals will refer to like elements in each embodiment. In FIG. 6, optical switch element 150 is a 2×1 optical switch element having two wave guide channel sections 104, 105 and two ports 106, 108 on an input side 101 and one wave guide channel section 152 and one port 156 on an output side 111. Examples of such a 2×1 optical switch element are optical switch element 150 as shown in FIG. 3, optical switch element 170 as shown in FIG. 4, or any equivalent thereof.

An optical light source 202 introduces a light signal 204 into first input port 106 of optical switch element 150. Light signal 204 selectively propagates through at least one wave guide channel sections 206, 208 within interaction region 110 to output port 156 in response to an electrical field across interaction region 110. An optical reflector 210 causes a reflection 212 of at least a portion of light signal 204 to occur on output side 111 of optical switch element 200 that is propagated back through interaction region 110 to at least one wave guide channel sections 104, 105, 206, 208. As will be discussed, optical reflector 210 may be located in a variety of positions, so long as optical reflector 210 is at least beyond the side of interaction region 110 out of which light signal 204 passes. A photodetector 220 is operably coupled to a second input port 108 of optical switch element 150 to detect a portion 214 of reflection 212. Feedback control circuit 222 is operably coupled to photodetector 220 and optical switch element 150 for controlling at least one voltage applied to at least one pair of electrodes 224, 226 in response to portion 214 of reflection 212. Feedback control circuit 222 is arranged and operated so as to minimize portion 214 of reflection 212, thereby effectively tuning optical switch element 150 to a desired switch state.

In contrast to the "cross" and "bar" switch states for a 2×2 optical switch element 100, the first and second switch states of a 2×1 optical switch element 150 are generally referred to as "on" and "off" in reference, for example, to a first one of input ports 106, 108.

In the following discussion of the use of the reflected signal 212 to time the 2×1 switch, the "on" state will be defined as the switch state providing the lowest loss for light propagating from port 106 to port 156 (or from port 156 to port 106). This state is also the state of highest loss for light propagating from port 156 to port 108 (or port 108 to port 156). The "off" state will be defined as the state having the lowcost loss for light propagation from port 108 to port 156 (or port 156 to port 108), and the highest loss for light propagating from port 106 to port 156 (or port 156 to port 106).

The timing of the switch 150 to the optimum "on" state then proceeds as follows. In the on state, light signal 204 launched into port 106 from 202 propagates with low loss through intersection region 110 into wave guide section 152. A portion 212 of light signal 204 is reflected by optical reflector 210 back through wave guide portion 152 into interaction region 110. Because the switch is in the on state, the majority of the reflected signal 212 is directed into wave guide channel section 104, having only a small amount of light in wave guide section 104, so that a minimum signal is detected by detector 220. The smaller the light detected at 220, the better the timing of the "on" state. Therefore, minimizing the signal detected at 220 optimizes the transfer characteristic of the switch in the "on" state.

The timing of the switch 150 to the optimum "off" state proceeds similarly. In this case, light signal 204 entering port 106 experiences high loss in interaction region 110; the higher the loss the better the "off" state. A small portion 212 of the light signal looking through the intersection region 110 will be reflected by reflector 210 back into interaction region 110. This small signal will be detected, in the off state, with the low loss into wave guide channel section 105 and out port 108 to detector 220. However, because the amount of light available to be reflected at reflector 210 is limited by the high loss of the path between ports 106 and 156 in the off state, minimizing the signal exiting port 108 and detected by detector 220 optimizes the transfer characteristic of the switch in the "off" state.

Figure 7:
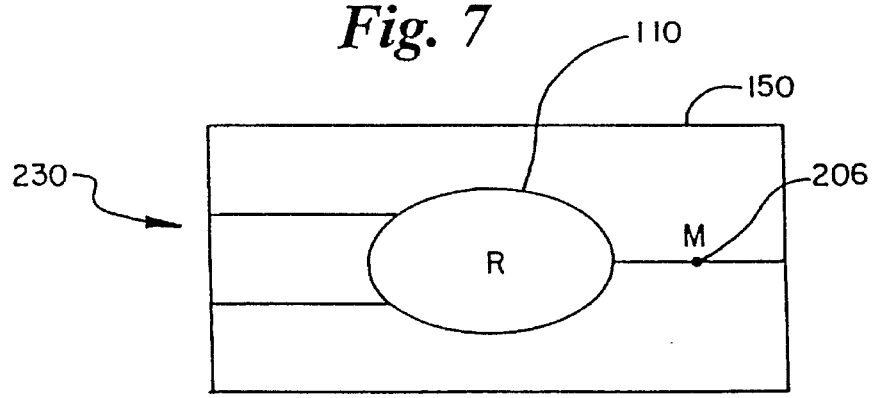
FIG. 7 is a plan view of an integrated optical switch element in which a means for causing a reflection of the present invention is positioned within the switch element.
Figure 8:
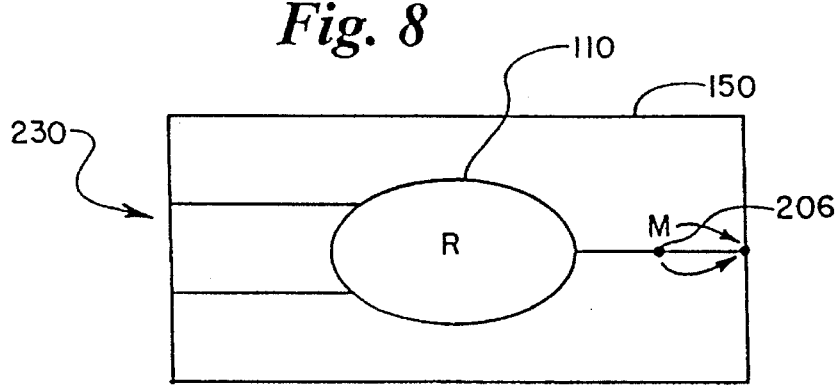
FIG. 8 is a plan view of an integrated optical switch element in which a means for causing a reflection of the present invention is positioned on a boundary of the switch element.
Figure 9:
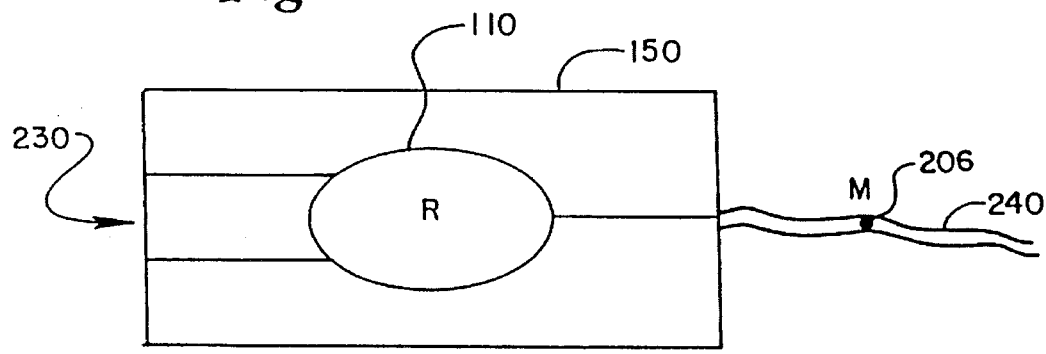
FIG. 9 is a plan view of an integrated optical switch element in which a means for causing a reflection of the present invention is positioned external to the switch element.

FIGS. 7, 8 and 9 are plan views of three different embodiments of integrated optical switch element 150 in which optical reflector 210 is positioned in various positions with respect to interaction region 110. In FIG. 7, optical reflector 210 is positioned within wave guide channel section 152 on the substrate of electro-optic material which comprises optical switch element 150. In this embodiment, optical reflector 210 can be implemented by a variety of means, including, geometric, structural or chemical alterations of wave guide channel section 152 or the cladding layer surrounding wave guide channel section 152, such as by etching to create an interference grating, doping of the electro-optic material within wave guide channel section 152 so as to alter the optical propagation characteristics to generate the desired reflected signal 212, electro-optically altering the propagation characteristics of wave guide channel section 152 by use of a further set of electrodes positioned beyond interaction region 110, by interaction with an acoustic wave or via photo-induced refractive index changes.

In FIG. 8, optical reflector 210 is located at output port 156 at the boundary of optical switch element 150. In a typical situation, this embodiment would take advantage of a slight mismatch in the boundary condition at output port 156 that results in a small reflection occurring at the boundary interface. For example, if there were a slight mismatch in between the optical index of wave guide channel section 152 and an optical transmission path connected to port 156, this mismatch of the index refraction can generate the desired reflected signal 212. Alternatively, reflected signal 212 could also be generated as a result of a reflective coating being applied to the chip facet of output port 156. Still other versions of this embodiment would include a temporary or set-up tuning version where a complete reflector, such as a mirror or the like, or even a partial reflector, is directly coupled to output port 156 for purposes of initially tuning or setting up the optimum transfer characteristics of optical switch element 150.

In FIG. 9, optical reflector 210 is positioned external to optical switch element 150. In this embodiment, control system 230 takes advantage of any number of reflections which may occur within an optical network that are external to optical switch element 150. For example, optical reflector 210 may be an imperfection in regularity within an optical fiber 240 that is optically coupled to output port 156. Alternatively, optical reflector 210 may be any of the optical interface mismatch situations which have been previously described which can generate a reflected signal 212. It will be apparent to a person skilled in the art that there are numerous mechanisms and techniques by which an effective optical reflector 210 can be either temporarily or permanently created as part of an optical network to provide necessary reflected signal 212 for purposes of the present invention.

It will be appreciated that, for the continual operation embodiments of control systems 200, 230, it is preferable that optical reflector 210 be sufficient to generate a reflected signal 212 that can be measured by the sensitivities of photodetector 220 when optical switch element 100, 150 is operating in an optimum mode with high extinction. With the sensitivities of present photodetectors and control electronics, it is preferred that reflected signal 212 would comprise between 1% and 50% of optical signal 204 within wave guide channel 156, for example. With reflected signal 212 operating in these ranges, the reflected portion 214 which will reach photodetector 220 for an optical switch element having a switching restriction ratio of 30db, for example, would be between 0.001% and 0.05%, ignoring losses. For the combination oflector 210 in a $LiNbO_3$ optical switch element and current silicon photodetectors, it is preferable that reflected signal 212 be between about 0.1% and 10%, and ideally about 4%, so that the portion of light signal 204 consumed by reflected signal 212 is significant enough to be detected, but not so large as to detract from the effective operation of the switch element. While the relationship between reflected signal 214 and light signal 204 is preferably linear, so as to simplify the control system of feedback control circuit 222, it will be understood that this relationship could also be nonlinear as long as the relationship is generally stable and known to feedback control circuit 222.

Figure 10:
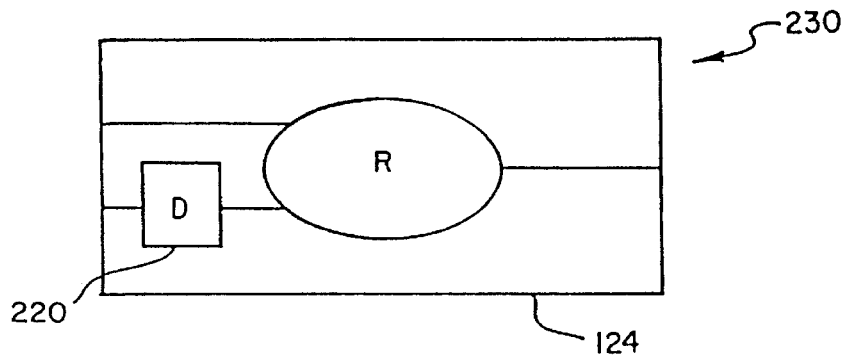
FIG. 10 is a plan view of a system in accordance with the present invention having a photodetector located on a common substrate with a second input port of the optical switch element.
Figure 11:
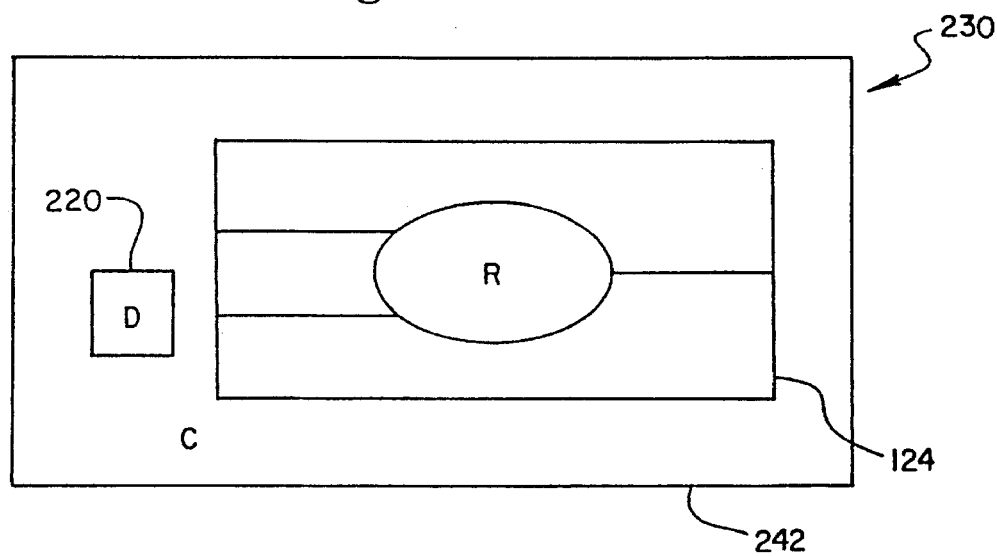
FIG. 11 is a plan view of a system in accordance with the present invention having a photodetector located on a separate substrate adjacent to a substrate of a second input port of the optical switch element.
Figure 12:
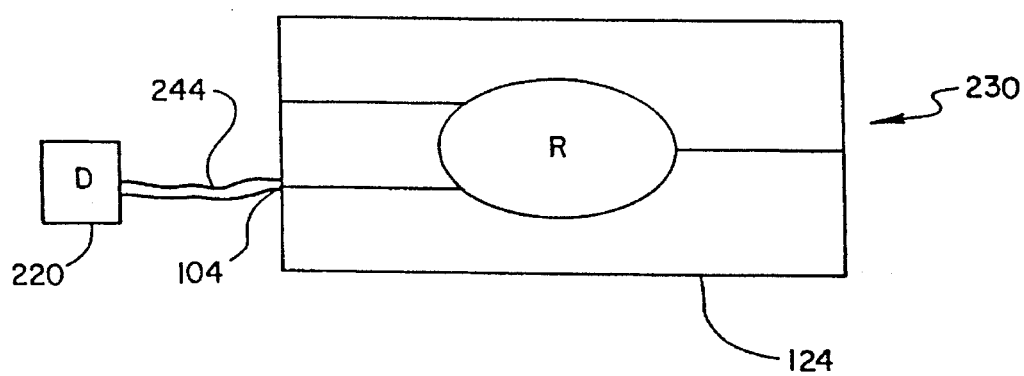
FIG. 12 is a plan view of a system in accordance with the present invention having a photodetector located physically removed from the optical switch element and optically connected to a second input port of the optical switch element.

Referring now to FIGS. 10, 11, and 12, a plan view of tuning system 230 in accordance with the present invention is shown having photodetector 220 located in various positions with respect to optical switch element 150.

In FIG. 10, photodetector 220 is positioned on the same electro-optic substrate 124 as interaction region 110 of optical switch element 150. In this embodiment, photodetector 222 could be integrated into wave guide channel 104. Examples of how it would be possible to accomplish this are shown, for example, in U.S. Pat. Nos. 5,065,201 and 5,261,014.

In FIG. 11, photodetector 222 is located on a substrate 242 that is separate from, and adjacent to, electro-optic substrate 124 on which optical switch element 150 is located. This multi-chip module embodiment can be utilized to achieve the advantages of the embodiment shown in FIG. 10, but to simplify the manufacturing and assembly techniques of tuning system 230. In this embodiment, for example, it would also be possible to include as another module contained on common substrate 242 the control electronics associated with the feedback control circuit 222 and control electrodes 224 and 226.

In FIG. 12, photodetector 220 is located physically removed from optical switch element 150 and is optically connected to second input port 108 by an optical fiber 244, for example.

Figure 13:
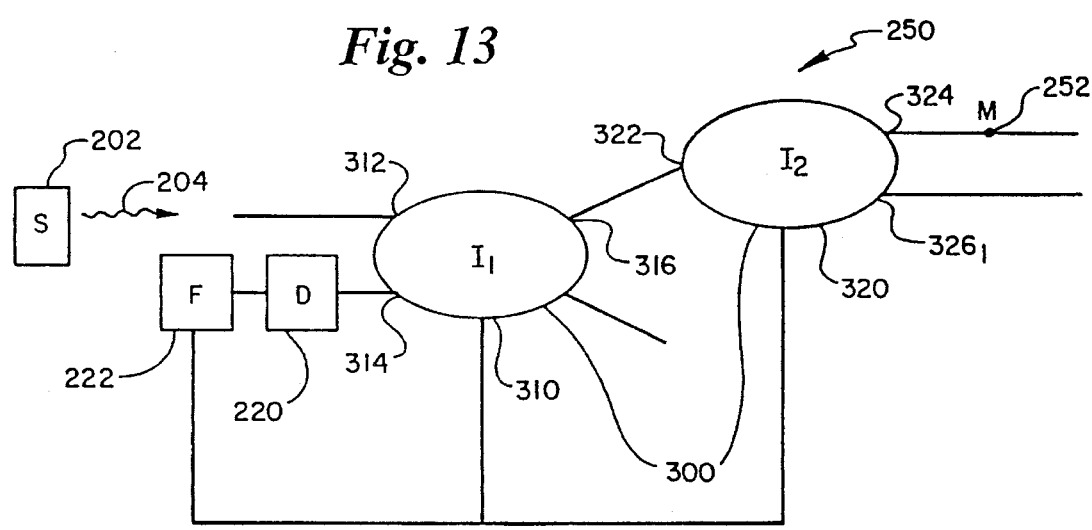
FIG. 13 is a schematic diagram of system for tuning an optical switch matrix in accordance with the present invention.
Figure 14:
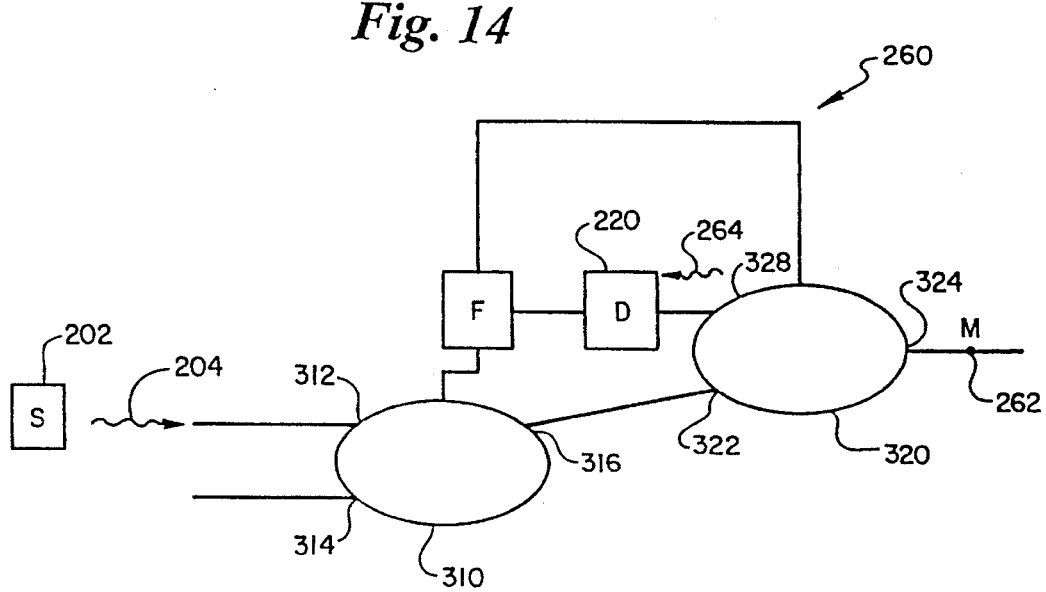
FIG. 14 is a schematic diagram of an alternate embodiment of a system for tuning an optical switch matrix in accordance with the present invention.
Figure 15:
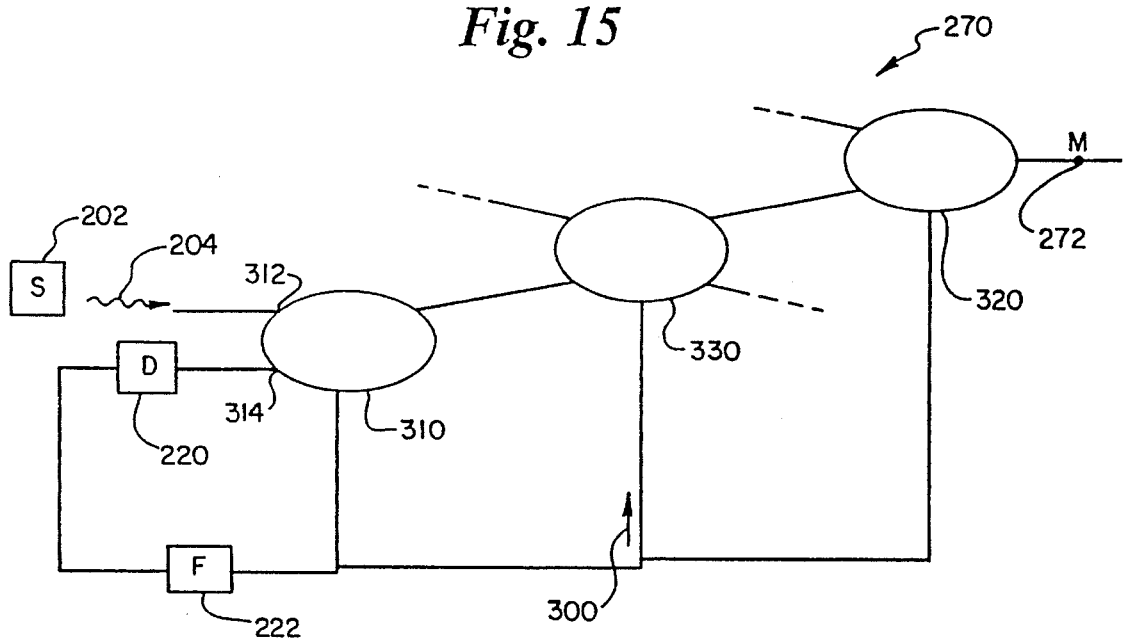
FIG. 15 is a schematic diagram of another alternate embodiment of a system for tuning an optical switch matrix in accordance with the present invention.

Referring now to FIGS. 13, 14 and 15, a tuning system 250, 260, 270 for use in an optical switch matrix 300 will now be described. Optical switch matrix 300 will include at least two optical switch elements 310, 320 which have output ports and input ports that are interconnected to form a switching matrix. As a minimum condition for such a optical switching matrix, at least one output port of matrix element 310 would be connected to an input port of matrix element 320. Examples of switching matrixes of this type are known in Thylen, L. and Granestand, P., "Switch Arrays for Photonic Switching: Status Review and Prospects", *IEEE Globecom '90 Conf. Proc.*, Vol. 2, Dec. 1990, pp. 1296–1300 and Zucker, J, and Alerness, R., "Photonic Switch Arrays Set to Prosper", *Physics World*, Vol. 4, No. 9, pp. 57–62. It is understood by those skilled in the art that the optical switch matrixes 300 to which control system 250 of the present invention can be applied can be constructed in a number of alternate embodiments such as within a common substrate, or in a multiple substrate, multiple-chip module arrangement, or even as individual discreet matrix elements 310, 320 which are optically connected together by optical fiber or other wave guide channels.

In FIG. 13, light signal 204 is generated by an optical source 202 and is directed into an input port 312 of matrix element 310. Output port 316 is optically connected to input port 322 of matrix element 320 having an optical reflector 252 located beyond an output side of an interaction region of this matrix element. As shown in FIG. 13, optical reflector 252 is located external to matrix element 320, although any of the positional embodiments of the optical reflector described with respect to FIGS. 10, 11 and 12 could be utilized for tuning system 250. A number of different feedback control arrangements can be accomplished through this embodiment. For example, if matrix element 320 is controlled so as to be in an ideal state in which light signal 204 is propagated to output port 324, then the reflected signal caused by optical reflector 252 will essentially mimic the reflected signal that would be caused by reflection external to port 316 and feedback control circuit 222 can use this information to tune matrix element 310 in isolation. Alternatively, if matrix element 320 is controlled so as to be in a state in which the majority of light signal 204 is propagated from input port 322 to output port 325 then the signal reflected by optical reflector 252 can be used to optimize the transfer characteristics of the combined switch matrix elements 310 and 320. In this case, feedback control circuit 222 would be simultaneously controlling the voltage electrodes for both matrix element 310 and 320. Still another embodiment would be possible where matrix element 310 had previously been optimized and matrix element 320 is the focus of optimization feedback control circuit 222. In this situation, the optimized control voltages would be applied to matrix element 310 and the control voltages would be altered on matrix element 320 so as to still minimize the reflected signal measured at detector 220.

It will be appreciated that in this embodiment optical reflector 252 can comprise more than a single reflection mechanism which operates to provide a reflected signal 254 that is detected by photodetector 220. Even though multiple reflection points may be associated with the reflected signal 254, the fundamental premise that reflected signal 254 is to be minimized by tuning system 250 does not change. In the case of switch matrix 300, the objective would be to exercise all of the possible switch combinations presented by switch matrix 300 and, for each such combination, minimize the combined reflected signal 254 which is detected by photodetector 220. In an optical switch matrix 300 having multiple matrix elements 310 into which a light signal 204 could be launched, it will be appreciated that, for this embodiment, a photodetector 220 would need to be coupled to an output port 314 of each matrix element 310. This could be accomplished either by providing separate photodetectors 220 for each matrix element 310, or by providing a single photodetector 220 and appropriate optical switching devices under control of feedback control circuit 222 to direct reflected signal 254 from the matrix element 310 under test into photodetector 220.

In FIG. 14, photodetector 220 is now connected to an input port 328 of matrix element 320. In contrast to the situation as shown in FIG. 13 where the reverse transfer characteristics of each matrix element 310, 320 were being optimized by tuning system 250, the embodiment of tuning system 260 as shown in FIG. 14 uses the forward transfer characteristics of matrix element 310 and the reverse transfer characteristics of 310 and the reverse transfer characteristics of matrix element 320 to accomplish feedback optimization. In other words, a transfer characteristics of matrix element 310 can be optimized by maximizing or minimizing the amount of light signal 204 exiting from output port 306 which now becomes the input light signal for input port 322 of matrix element 320. Matrix element 320, in turn, is optimized by measuring the reverse transfer characteristics associated with reflected signal 264 at detector 220.

FIG. 15 shows another embodiment of tuning system 270 having a optical matrix 300 which is at least three switches deep. In this embodiment, in addition to matrix elements 310 and 320 one or more matrix elements 330 are disposed between the matrix element 310 into which light signal 204 is launched and matrix element 320 beyond which optical reflector 272 is positioned. Regardless of the configuration of any intermediary matrix elements 330, the objective of tuning system 270 is to minimize the reflected signal 274 detected at photodetector 220. It would be appreciated, that either of the embodiments of the positions of photodetector 220 as shown in FIG. 13 and FIG. 14 could be implemented in tuning system 270. Alternatively, the position of matrix elements 310 and 330 could be reversed such that light signal 204 from light source 202 was introduced into the "middle" of switch matrix 300. In this embodiment, however, detector 220 would need to be positioned at an input port of matrix element 330 in order to include matrix element 330 within the scope of the matrix elements that could be tuned by tuning system 270. It would be understood that the effective depth of matrix elements 310, 320 and 330 which can be tuned by a tuning system 270 will primarily be a function of the number and magnitude of inherent reflections within matrix 300 which can be detected by tuning system 270, and by the sensitivity of photodetector 220 to accurately measure and differentiate between very small variations in reflected signal 274.

One application where tuning of an optical switch element is particularly useful is in an optical time domain reflectometer (OTDR) system which tests for flaws or faults in optical fibers or channels. It is well known that optical switch elements can improve the performance of an OTDR system by selectively protecting the high gain optical detection system used by the OTDR system from excessively strong reflections that would otherwise saturate the detector system and produce a "dead zone" in which no reflections from other fiber features or flaws can be seen by the OTDR. Examples of OTDRs and the use of optical switch elements in an OTDR are shown in U.S. Pat. Nos. 5,149,961, 5,144,125, 5,093,568, 5,072,111, 5,045,689, 5,028,775, 5,023,445, 5,013,907, 4,968,880 and 4,960,989.

Figure 16:
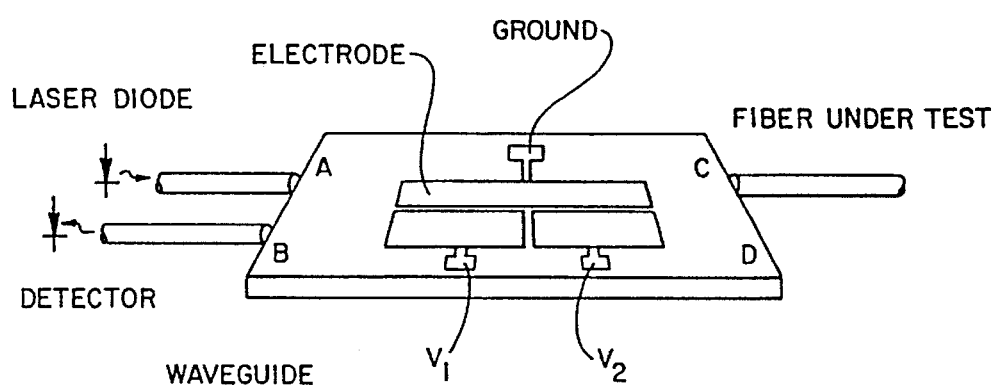
FIG. 16 is a schematic diagram showing the system of the present invention as implemented by the use of a 2×2 integrated optical switch element in an Optical Time Domain Reflectometer (OTDR).

Typical configuration of an integrated optical swtich in an OTDR is shown in FIG. 16. A fiber under test 300 is optically coupled to one output port 116, 118 of a pigtailed LiNbO$_3$ directional coupler 100. A laser diode 222 and a detector 220 are connected to the input ports 112 and 114, respectively. The voltages $V_1$ and $V_2$ applied to control electrodes 130 and 132 are varied under control of feedback control circuit 222 to put the swtich in an optimal cross or bar state. The bar state is used to launch light into the fiber; the cross state allows reflections from features in the fiber to reach the detector for analysis.

An easy way to understand the operation of a directional coupler element 100 in terms of its extinction ratio is by examining the "transfer function" of the optical switch. For purposes of the present invention, the transfer function is a two-dimensional map of the operational states of the directional coupler for all possible combinations of operating voltages $V_1$ and $V_2$. It will be understood that for different electrode configurations of the directional coupler (e.g., one pair of electrodes or three or more pairs of electrodes) the set of operating voltages for the cross states and bar states of the device will include a number of voltage values corresponding to the number of electrode pair combinations.

Figure 17:
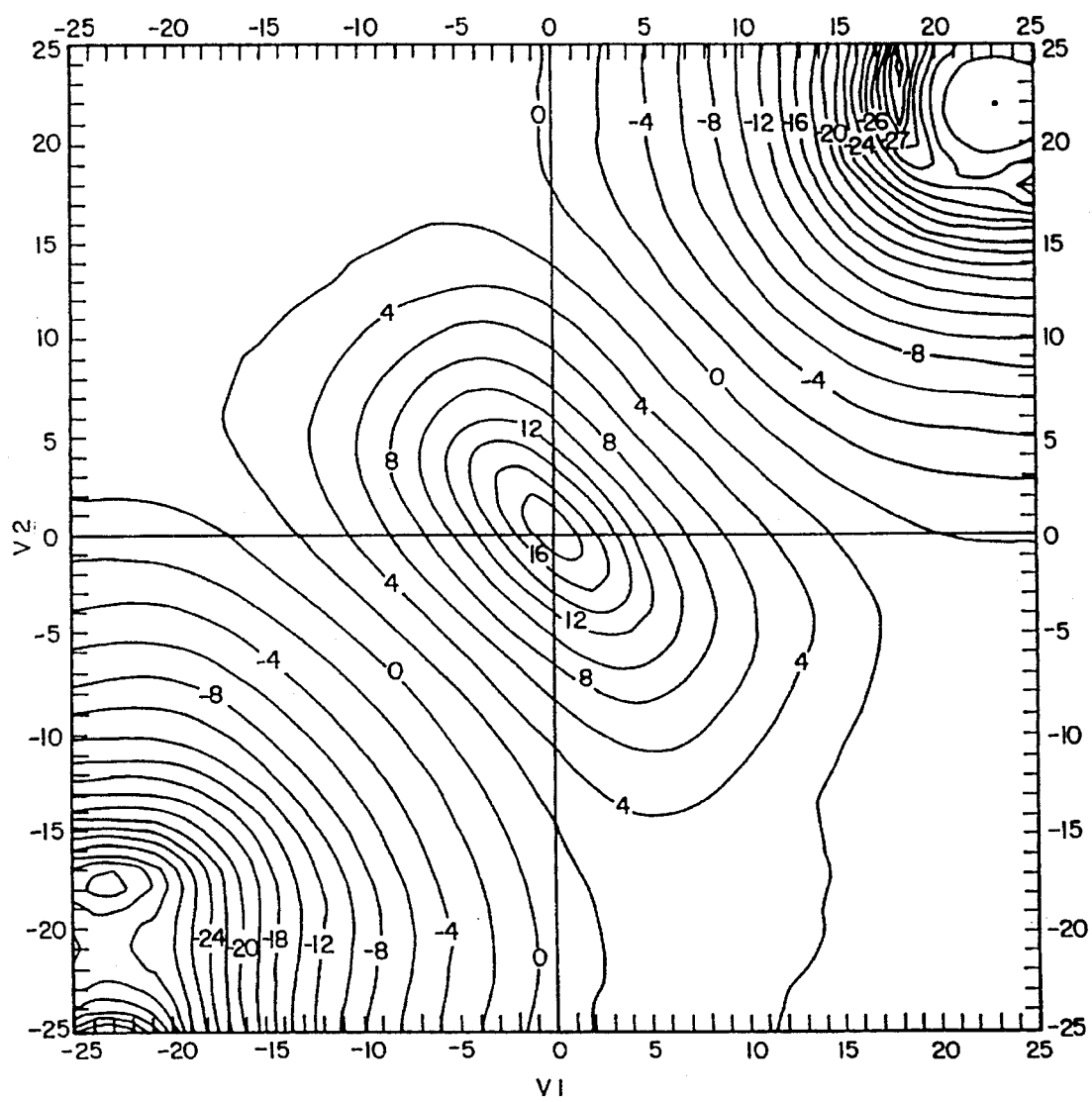
FIG. 17 is a plot of the measured extinction ratios of directional coupler from FIG. 16.

To generate the transfer function, the extinction ratio is measured for representative values of operating voltages $V_1$ and $V_2$, and the results are plotted as equal-value contours on a contour plot as shown, for example, in FIG. 17 for a TE polarized light signal as measured with respect to the switch element shown in FIG. 16. Wherever there is a positive contour (i.e., a ratio greater than 1), this indicates combinations of voltages $V_1$ and $V_2$ that result in cross states for the directional coupler where most of the light signal crosses over from the first wave guide to the second wave guide as it passes through the directional coupler. Whenever there is a negative contour (i.e., a ratio less than 1), this indicates combinations of voltages $V_1$ and $V_2$ that result in bar states wherein most of the light signal remains within the first wave guide as it passes through the directional coupler element. Areas of the contour plots which represent high-quality cross states can be seen as peaks or ridges and areas of the contour plot which represent high-quality bar states can be seen as valleys. Typically, the required extinction ratio for high quality cross states will be at least 15 dB, although it will be understood that different values for the extinction ratio necessary to achieve a high quality cross state may be required for different applications or uses of a directional coupler 100.

It should be noted in FIG. 17 that the measured extinction ratios of directional coupler 100 are not optimized for use with the present invention because no precautions were taken to prevent reflections from the fiber-to-chip interface at output ports 116 and 118. When coherent light is used for light signal 204, significant reflections from both output ports 116 and 118 are experienced and oscillations in the apparent extinction ratio as measured can results to due to interferometric effects.

Figure 18:
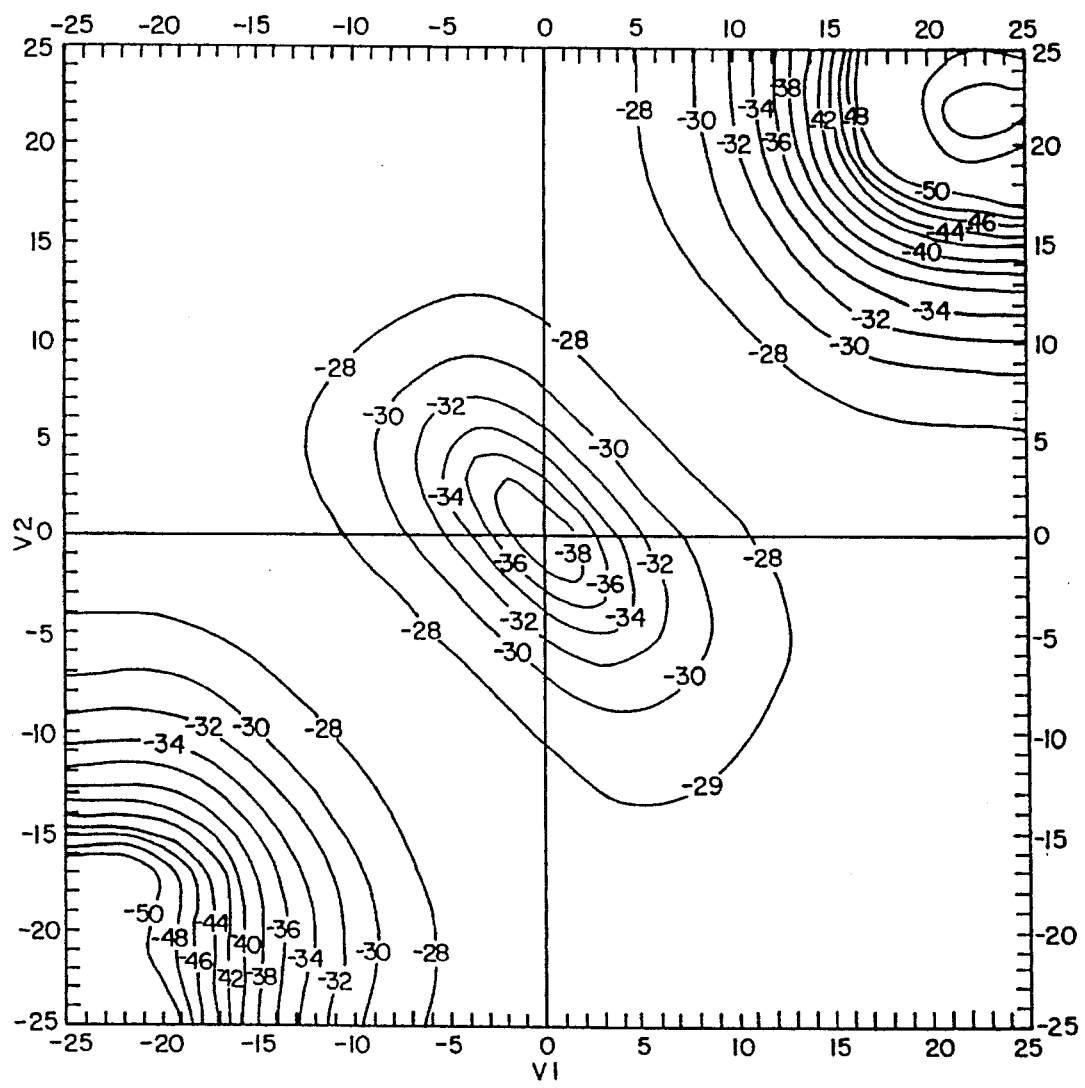
FIG. 18 compares the calculated reflected power with the measured switch extinction ratio from FIG. 17 for the directional coupler of FIG. 16.

FIG. 18 compares the calculated reflected power, based on Eq. (2) and the measured switch extinction ratio from FIG. 17 for directional coupler 100 of FIG. 16. In this case, it has been assumed that the reflection at each fiber-to-chip interface at output port 116 and 118 is 3.6%, and the input power of $P_o$ is - 10 dB. Fiber coupling loss and interferometric effects have been neglected.

Figure 19:
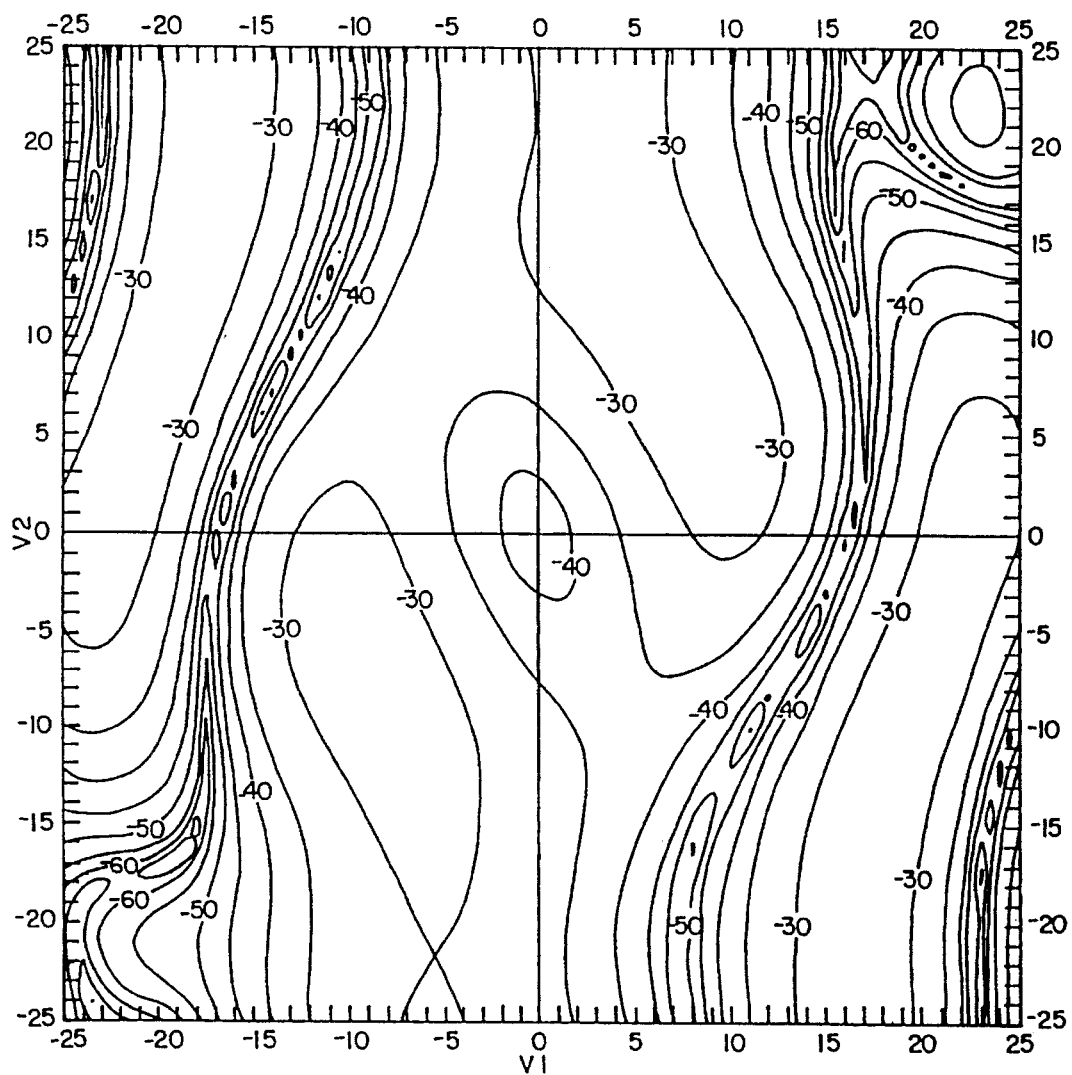
FIG. 19 shows the measured reflected power for the directional coupler of FIG. 16.

FIG. 19 shows the measured reflected power for directional coupler 100 of FIG. 16. It will be noted that, in spite of the "vertical bar" distortions seen at 310 that are due to the multiple coherent reflections, the optimum cross state at ($V_1=0$, $V_2=0$) and bar state ($V_1=23$, $V_2=22$) are still accurately located by the present invention.

To improve the performance of the present invention, it is desirable to control the various sources of reflections within the overall optical system being tuned. One practical technique for controlling reflections is to suppress the chip-to-fiber interface reflection and provide for an external reflection, as shown in FIG. 9. A controlled reflection for tuning could be provided for the OTDR system shown in FIG. 16, for example, by leaving output port 118 open to the air (14% reflection), or by attaching a dead-end length of fiber to port 118 (4% reflection), or by coating output port 118 for additional reflection, or simply be leaving the connector between output port 116 and fiber under test 300 disconnected during the tuning process (about 4% reflection)

In the OTDR application, light reflected from the fiber under test will be of varying polarization so that the switch must achieve high extinction ratio for both TE and TM polarizations. Preferably, this is accomplished by providing a polarization-independent switch element 100 in accordance with the teachings of the previously referenced copending application entitled "POLARIZATION-INDEPENDENT ELECTRO-OPTICALLY SWITCHED DIRECTIONAL COUPLER". For tuning to states of high extinction for both TE and TM polarization so that polarization-independent switching can be obtained, it is desirable to insure that substantial amounts of both TE and TM light are reflected into switch element 100. This can be accomplished by using a standard single-mode fiber between light source 202 and switch element 100 with a paddle-type polarization controller adjusted to launch either a circularly polarized light signal 204, or a linearly polarized light signal 204 oriented at 45 degrees from the surface of switch element 100. Still another technique for accomplishing polarization-independence would be to use a polarization-maintaining (PM) fiber between light source 202 and switch element 100 with light signal 204 at 45 degrees to the PM fiber birefringence axis and the PM fiber aligned with its birefringence axis along a principal axis of switch element 100, or by light signal 204 being launched along the axis of PM fiber and the fiber axis being aligned at 45 degrees with respect to the principal axis of switch element 100. Other alternatives would be to use some type of polarizing (PZ) fiber with a fiber polarization axis aligned with the polarization of light signal 204, but at 45 degrees to the axes of switch element 100.

Figure 20:
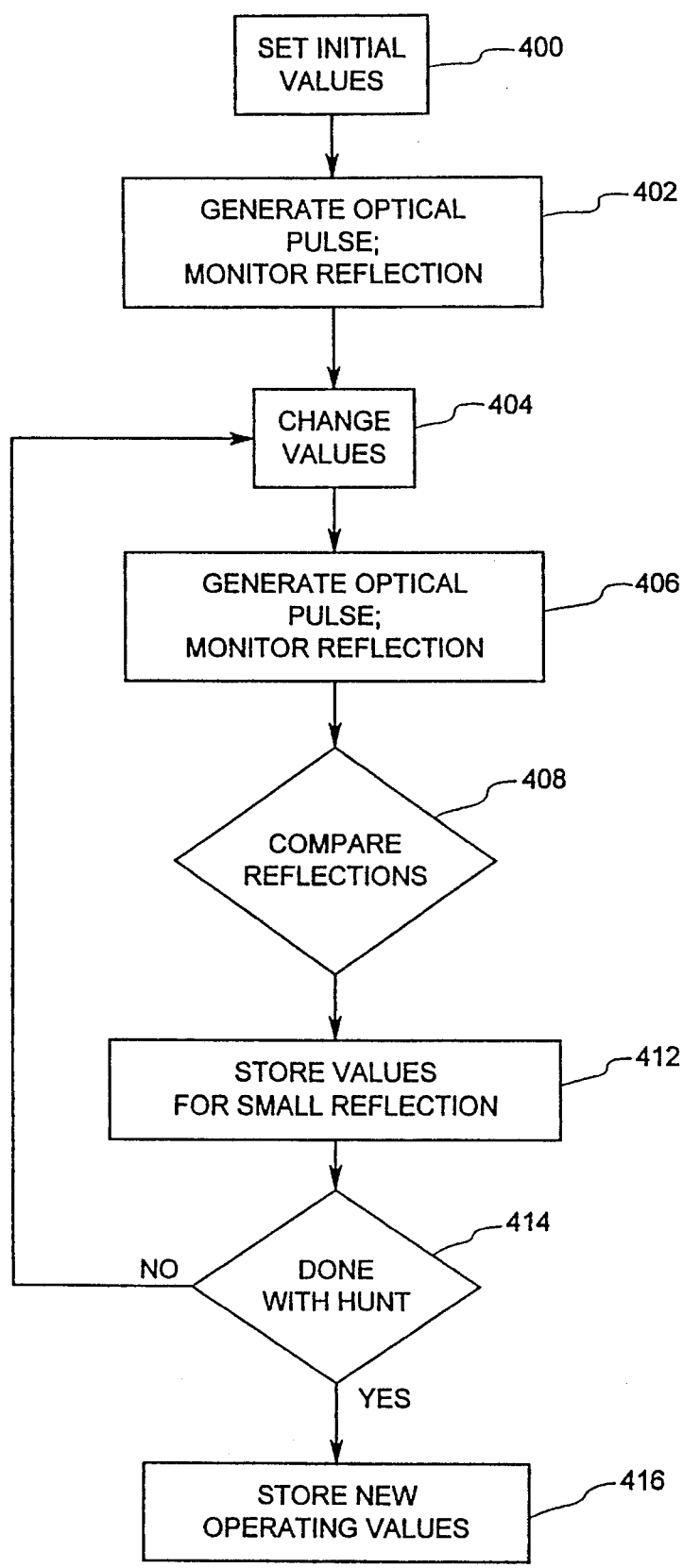
FIG. 20 is a flow chart of a preferred embodiment of the feedback decision process of the present invention.

In the OTDR application, best results are obtained if the results of tuning system 200 are performed just prior to the measurement routine of a fiber under test 300. One convenient and exemplary process for operating feedback control circuit 222 to accomplish the optimization of the switch cross state by minimization of power reflected to the detector is described in the flow diagram shown in FIG. 20. At step 400, initial values of ($V_1$, $V_2$) approximating the cross state are established, either from the last known optimized cross state values, or from best estimated values based on the design of the directional coupler 100 being tuned. At step 402, an optical pulse light signal 204 (or series of pulses) is launched from light source 202 and the optical power of $P_b$ is monitored at detector 220. Feedback control circuit 222 then adjusts the values of voltages ($V_1$, $V_2$) by a predetermined increment at step 404. Another optical pulse light signal 204 (or series of pulses) is launched at step 406 and the reflected optical power is monitored at detector 220. Step 408 compares the two detected values from steps 402 and 406 and step 412 stores the voltage values ($V_1$, $V_2$) corresponding to the smaller monitored optical power $P_b$ as the new initial values. At decision 414, control is returned to step 402 until the predetermined incremental hunt pattern has been exhausted and/or the minimum has been found or the new determined tuned cross state operating values for voltages ($V_1$, $V_2$) are stored and the feedback routine is exited at step 416. The same routine can be used, starting with approximate bar state voltages, to optimize the bar state operating voltages.

Figure 21:
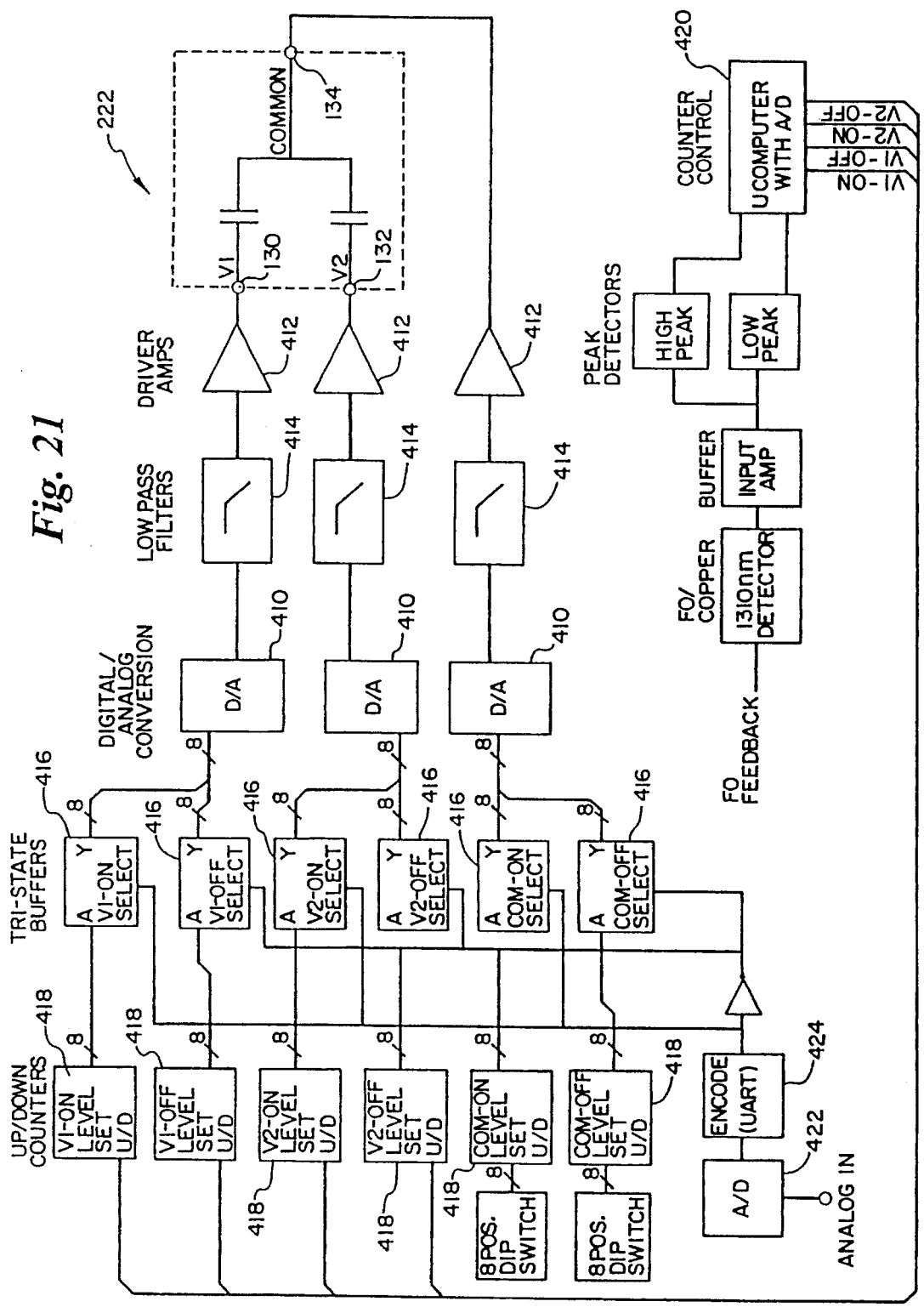
FIG. 21 is a schematic block diagram of a preferred embodiment of the control electronics of the feedback control of the present invention.

A block diagram of a feedback control circuit 222 for use with the present invention is shown in FIG. 21. Control voltages for each of the three control electrodes 130, 132 and 134 of directional coupler 100 are provided by three digital-to-analog converters 410, each coupled to driver amps 412. The input of each D/A is one of two voltage levels, selected by a buffer 416 according to which state, cross state (=ON) or bar state (=OFF) of switch element 100 is being tuned. Up/down counters 418 are used to hold the six voltage levels corresponding to the ON and OFF levels of the three control electrode 130, 132 and 134. The desired state of the switch for tuning purposes is provided as an input to a microprocessor 420, in this case through an A/D 422 and UART 424. UART 424 also toggles buffers 416 between the ON and OFF states. Microprocessor 420 keeps track of the light levels detected by photodetector 220 and changes the voltage levels stored in up/down counters 418 by small, fixed amounts, corresponding to steps of approximately 0.2 V in each of eight symmetrical directions, separated by 45 degrees (in the two-dimensional voltage space of FIG. 19), around the currently stored "best operating point". Whenever a decrease in the detected output power is found, the new voltage levels are stored in the up/down counters.

We claim:

1. A system for tuning at least one integrated optical switch element, each optical switch element formed of an electro-optic material having an interaction region and at least one wave guide channel extending through the interaction region, at least a first input port and a second input port defined on a first side of the interaction region into which a light signal enters, at least one output port defined on a second side of the interaction region out of which the light signal selectively exits, and at least a pair of electrodes for selectively producing an electric field across the interaction region that electro-optically actuates a desired switch state of the optical switch element, the system comprising:

an optical light source that introduces a light signal into a first input port of an optical switch element, the light signal propagating through at least one wave guide channel to an output port in response to an electrical field across an interaction region;

means for causing a reflection of at least a portion of the light signal to occur beyond a second side of an interaction region that is propagated back through at least one wave guide channel;

a photodetector operably coupled to a second input port of an optical switch element to detect a portion of the reflection; and a feedback means operably coupled to the photodetector and at least one optical switch element for controlling at least one voltage applied to at least one pair of electrodes in response to the portion of the reflection detected by the photodetector to minimize the portion of the reflection and thereby selectively tune at least one optical switch element to a desired switch state.

2. The system of claim 1 wherein at least one optical switch element has only one output port, and wherein the light signal selectively exits the one output port by activating the desired switch state, and is selectively excluded from the one output port by actuating a second desired switch state.

3. The system of claim 1 wherein at least one optical switch element has two wave guide channels extending through the interaction region, a first wave guide channel extending between the first input port and a first output port and a second wave guide channel extending between the second input port and a second output port, and wherein the light signal selectively exits primarily from the first output port by activating a first desired switch state and selectively exits primarily from the second output port by activating a second desired switch state.

4. The system of claim 1 wherein the optical switch element is selected from the set comprising: a Y-branch switch, a balanced bridge switch, an X-branch switch or a directional coupler.

5. The system of claim 1 wherein the means for causing a reflection is positioned at a location selected from the set comprising: a location within an optical switch element, a location at a boundary of an optical switch element or a location external to at least one optical switch element.

6. The system of claim 1 wherein a location of the photodetector is selected from the set comprising: a location on a common substrate with the second input port of an optical switch element that is optically coupled to the second input port of the optical switch element; a location on a substrate separate from a substrate on which the second input port of an optical switch element is located wherein the substrate of the photodetector and substrate of the optical switch element are both part of a multichip module with the photodetector optically coupled to the second input port of the optical switch element; and a location that is physically separate from an optical switch element having the second input port that is optically coupled to the photodetector via an optical fiber or other optical element.

7. The system of claim 1 wherein the interaction region of each optical switch element is defined by the larger of (a) a region defined along at least one wave guide channel in which there are modifications of optical properties of at least one wave guide channel for purposes of controlling light signals in at least one wave guide channel, and (b) a region where the electric field is applied for purposes of controlling light signals in at least one wave guide channel.

8. The system of claim 1 wherein the light signal enters a first input port of a first optical switch element and the reflection occurs beyond a second side of an interaction region of a second optical switch element, which is optically coupled to the first optical switch element.

9. The system of claim 1 wherein the light signal enters a first input port of a first optical switch element and the portion of the reflection is detected at a second input port of a second optical switch element, which is optically coupled to the first optical switch element.

10. The system of claim 9 wherein the reflection occurs beyond a second side of an interaction region of a third optical switch element.

11. The system of claim 10 wherein the feedback means controls at least one switch element by applying the voltages to at least one pair of electrodes which are selected from the set comprising: at least one pair of electrodes of the first optical switch element; at least one pair of electrodes of the second optical switch element; at least one pair of electrodes of the third optical switch element; or any combination thereof.

12. The system of claim 1 wherein there are a plurality of optical switch elements, and wherein there are a plurality of photodetectors each of which is optically coupled to a second input port of a unique one of the plurality of optical switch elements, and wherein the feedback means selectively utilizes the reflections detected by the plurality of photodetectors.

13. The system of claim 1 wherein at least one optical switch element is part of an optical time domain reflectometer (OTDR), and wherein the optical light source is a laser light source in the OTDR, the photodetector is a photodetector in an optical detection system of the OTDR, and the feedback means comprises a software program executing in a computer processor in the OTDR and controlling at least one circuit means for setting the voltages applied to at least one pair of electrodes of the optical switch element.

14. A method for tuning at least one integrated optical switch element, each optical switch element formed of an electro-optic material having an interaction region and at least one wave guide channel extending through the interaction region, at least a first input port and a second input port defined on a first side of the interaction region into which a light signal enters, at least one output port defined on a second side of the interaction region out of which the light signal selectively exits, and at least a pair of electrodes for selectively producing an electric field across the interaction region that electro-optically actuates a desired switch state of the optical switch element, the method comprising the steps of:

(a) introducing a light signal into a first input port that propagates through at least one wave guide channel to an output port in response to the electrical field across an interaction region;

(b) causing a reflection of at least a portion of the light signal to occur beyond a second side of an interaction region that is propagated back through at least one wave guide channel;

(c) detecting a portion of the reflection from step (b) at a second input port; and (d) controlling one or more voltages applied to at least one pair of electrodes in response to the portion of the reflection detected in step (c) so as to minimize the portion of the reflection detected in step (c) and thereby selectively tune at least one optical switch element to the desired switch state.

15. The method of claim 14 wherein at least one optical switch element has only one output port, and wherein step (a) selectively propagates the light signal to the one output port by activating a first desired switch state of the optical switch element and selectively excludes the light signal from the one output port by activating a second desired switch state.

16. The method of claim 14 wherein at least one optical switch element has two wave guide channels extending through the interaction region, a first wave guide channel extending between the first input port and a first output port and a second wave guide channel extending between the second input port and a second output port, and wherein step (a) selectively propagates the light signal primarily to the first output port by activating a first desired switch state and selectively propagates the light signal primarily to the second output port by activating a second desired switch state.

17. The method of claim 14 wherein step (b) causes a partial reflection that occurs at a location selected from the set comprising: within an optical switch element; at a boundary of an optical switch element; or external to at least one optical switch element.

18. The method of claim 14 wherein step (d) controls the voltages so as to decrease the reflection detected in step (c) to less than a percentage of the light signal introduced into the first input port of step (a) that is determined by a desired switching extinction ratio for an optical switch element.

19. The method of claim 14 wherein step (a) introduces the light signal into a first input port of a first optical switch element and step (b) causes the reflection beyond a second side of an interaction region of a different optical switch element.

20. The method of claim 14 wherein step (a) introduces the light signal into a first input port of a first optical switch element and step (c) detects the portion of the reflection at a second input port of a second optical switch element.

21. The method of claim 20 wherein step (b) causes the reflection beyond a second side of an interaction region of a third optical switch element.

22. The method of claim 21 wherein step (d) controls the one or more voltages by applying the voltages to at least one pair of electrodes selected from the set comprising: at least one pair of electrodes of the first optical switch element, at least one pair of electrodes of the second optical switch element, at least one pair of electrodes of the third optical switch element, or any combination thereof.

23. The method of claim 14 wherein there are a plurality of optical switch elements and wherein there are a plurality of photodetectors each of which is optically coupled to a second input port of a unique one of the plurality of optical switch elements, and wherein step (c) is performed for each of the photodetectors and step (d) selectively utilizes the reflections detected by the photodetectors in step (c).

24. A tunable integrated optical switch element device comprising:

an electro-optic material having an interaction region and at least one wave guide channel extending through the interaction region, at least a first input port and a second input port defined on a first side of the interaction region into which a light signal enters, at least one output port defined on a second side of the interaction region out of which the light signal selectively exits, and at least a pair of electrodes for selectively producing an electric field across the interaction region that electro-optically actuates a desired switch state of the optical switch element;

means within the optical switch element for causing a reflection of at least a portion of the light signal to occur beyond the second side of the interaction region that is propagated back through at least one wave guide channel;

a photodetector optically coupled to the second input port of the optical switch element to detect a portion of the reflection that is propagated back; and a feedback circuit electrically coupled to the photodetector and the optical switch element to control one or more voltages applied to at least one pair of electrodes in response to the portion of the reflection detected by the photodetector to minimize the portion of the reflection and thereby selectively tune the one optical switch element to a desired switch state.

25. The device of claim 24 wherein the interaction region is defined by the larger of a region defined along the at least one wave guide channel in which there are modifications of optical properties of the at least one wave guide channel for purposes of controlling light signals in the at least one wave guide channel and a region where the electric field is applied for purposes of controlling light signals in the at least one wave guide channel.

26. The device of claim 24 wherein the optical switch element has only one output port, and wherein the light signal is selectively propagated to the one output port by activating a first desired switch state and is selectively excluded from the one output port by activating a second desired switch state.

27. The device of claim 24 wherein the optical switch element has two wave guide channels extending through the interaction region, a first wave guide channel extending between the first input port and a first output port and a second wave guide channel extending between the second input port and a second output port, and wherein the light signal selectively exits primarily from the first output port by activating a first desired switch state and selectively exits primarily from the second output port by activating a second desired switch state.

28. The device of claim 24 wherein the optical switch element is selected from the set comprising: a Y-branch switch, a balanced bridge switch, an X-branch switch or a directional coupler.

29. The device of claim 24 wherein a location of the photodetector is selected from the set comprising: on a common substrate with the second input port of the optical switch element and is optically coupled to the second input port of the optical switch element, or on a substrate separate from a substrate on which the second input port of the optical switch element is located and the substrate of the photodetector and substrate of the optical switch element are both part of a multichip module with the photodetector optically coupled to the second input port of the optical switch element.

30. A tunable integrated optical switch matrix apparatus comprising:

a substrate formed of an electro-optic switch material;

a plurality of optical switch elements defined in the substrate, at least some of the optical switch elements being optically coupled to one another and each optical switch element including:

an interaction region;

at least one wave guide channel extending through the interaction region;

at least a first input port and a second input port defined on a first side of the interaction region into which a light signal selectively enters;

at least one output port defined on a second side of the interaction region out of which the light signal selectively exits; and at least a pair of electrodes for selectively producing an electric field across the interaction region that electro-optically actuates a desired switch state of the optical switch element;

means within the optical switch matrix apparatus for causing a reflection of at least a portion of a light signal entering a first input port of a first optical switch element to occur beyond a second side of an interaction region of a second optical switch element;

a photodetector optically coupled to a second input port of an optical switch element to detect a portion of the reflection; and feedback means operably coupled to the photodetector and the plurality of optical switch elements for controlling one or more voltages applied to the at least one pair of electrodes in response to the portion of the reflection detected by the photodetector to minimize the portion of the reflection and thereby selectively tune at least one of the plurality of optical switch elements to a desired switch state.

31. The apparatus of claim 30, wherein there are a plurality of photodetectors each of which is optically coupled to a second input port of a unique one of at least some of the plurality of optical switch elements, and wherein the feedback means selectively utilizes the reflections detected by the plurality of photodetectors.

32. The apparatus of claim 30, wherein at least one optical switch element has only one output port, and wherein the light signal is selectively propagated to the one output port by activating a first desired switch state, and is selected excluded from the one output port by activating a second desired switch state.

33. The apparatus of claim 30 wherein at least one optical switch element has two wave guide channels extending through the interaction region, a first wave guide channel extending between the first input port and a first output port and a second wave guide channel extending between the second input port and a second output port, and wherein the light signal selectively exits primarily from the first output port by activating a first desired switch state and selectively exits primarily from the second output port by activating a second desired switch state.

34. The apparatus of claim 30 wherein the means for causing a reflection is positioned at a location selected from the set comprising: within at least one of optical switch elements; or within the optical switch matrix apparatus and external to the optical switch elements.

35. The apparatus of claim 30 wherein the substrate is selected from the set comprising: a monolithic substrate, or a plurality of monolithic substrates optically and physically coupled together to form a multiple module.

36. The apparatus of claim 30 wherein the location of the photodetector is selected from the set comprising: on the substrate, or external to the substrate.

37. The apparatus of claim 30 wherein the interaction region of each optical switch element is defined by the larger of a region defined along the at least one wave guide channel in which there are modifications of optical properties of the at least one wave guide channel for purposes of routing light signals in the at least one wave guide channel and a region where the electric field is applied for purposes of routing light signals in the at least one wave guide channel.

38. The apparatus of claim 30 wherein the light signal enters a first input port of the first optical switch element and the reflection is detected at a second input port of the first optical switch element.

39. The apparatus of claim 30 wherein the light signal enters a first input port of a first optical switch element and the portion of the reflection is detected at a second input port of a third optical switch element.

40. The apparatus of claim 39 wherein the feedback means controls the at least optical switch element by applying the voltages to at least one pair of electrodes selected from the set comprising: at least one pair of electrodes of a first optical switch element, at least one pair of electrodes of a second optical switch element, at least one pair of electrodes of a third optical switch element, or any combination thereof.

* * * * *